United States Patent
Ito et al.

(10) Patent No.: US 7,481,369 B2
(45) Date of Patent: Jan. 27, 2009

(54) METHOD AND APPARATUS FOR OPTICALLY PICKING UP AN IMAGE OF AN INFORMATION CODE

(75) Inventors: Kunihiko Ito, Chiryu (JP); Tadao Nojiri, Oobu (JP)

(73) Assignee: Denso Wave Incorporated, Tokyo (JP)

( * ) Notice: Subject to any disclaimer, the term of this patent is extended or adjusted under 35 U.S.C. 154(b) by 479 days.

(21) Appl. No.: 11/029,671

(22) Filed: Jan. 6, 2005

(65) Prior Publication Data

US 2005/0167498 A1  Aug. 4, 2005

(30) Foreign Application Priority Data

Jan. 8, 2004  (JP)  ............... 2004-002941

(51) Int. Cl.
G06K 7/00 (2006.01)
G06K 7/14 (2006.01)
G06K 7/10 (2006.01)
(52) U.S. Cl. .................. 235/454; 235/435; 235/462.01
(58) Field of Classification Search ................. 235/454, 235/435, 462.01
See application file for complete search history.

(56) References Cited

U.S. PATENT DOCUMENTS

| 5,144,426 | A | * | 9/1992 | Tanaka et al. | 375/240.13 |
| 5,184,216 | A | * | 2/1993 | Kobayashi | 348/207.99 |
| 5,196,684 | A | * | 3/1993 | Lum et al. | 235/462.42 |
| 5,249,242 | A | * | 9/1993 | Hanson et al. | 382/269 |
| 5,691,773 | A | * | 11/1997 | Wang et al. | 348/249 |
| 5,694,224 | A | * | 12/1997 | Tai | 358/3.01 |
| 5,902,988 | A | * | 5/1999 | Durbin | 235/472.01 |
| 6,006,990 | A | * | 12/1999 | Ye et al. | 235/454 |
| RE37,091 | E | * | 3/2001 | Tanaka et al. | 348/409.1 |
| 6,473,464 | B1 | * | 10/2002 | Weitbruch et al. | 375/240.26 |
| 6,606,421 | B1 | * | 8/2003 | Shaked et al. | 382/275 |
| 7,083,098 | B2 | * | 8/2006 | Joseph et al. | 235/454 |
| 7,085,430 | B2 | * | 8/2006 | Winsor et al. | 382/275 |
| 7,095,876 | B2 | * | 8/2006 | Broekaert | 382/107 |
| 7,128,270 | B2 | * | 10/2006 | Silverbrook et al. | 235/472.01 |
| 2001/0015815 | A1 | * | 8/2001 | Hada et al. | 358/1.9 |
| 2001/0022856 | A1 | * | 9/2001 | Matsumoto | 382/238 |

(Continued)

FOREIGN PATENT DOCUMENTS

JP  2000-298300  10/2000
JP  2003-57707  2/2003

*Primary Examiner*—Daniel Walsh
(74) *Attorney, Agent, or Firm*—Posz Law Group, PLC

(57) ABSTRACT

An apparatus has a photodetector with a plurality of pixels arranged in at least one dimension. The apparatus is designed to optically pick up an image of an information code by the pixels of the photodetector. In the apparatus, an establishing unit establishes a preliminary correcting region on part of the image data. A preliminary correcting unit provides a correcting variable that estimates a shift amount of the image data; and preliminarily corrects the part of the image data within the preliminary correcting region based on a value of the correcting variable. A determining unit determines whether the preliminary correction of the preliminary correcting unit is proper based on the corrected result. When the determining unit determines that the preliminary correction of the preliminary correcting unit is proper, a correcting unit corrects the image data based on the value of the correcting variable.

23 Claims, 12 Drawing Sheets

U.S. PATENT DOCUMENTS

| | | | |
|---|---|---|---|
| 2002/0067432 A1* | 6/2002 | Kondo et al. | 348/576 |
| 2002/0139857 A1* | 10/2002 | Ishii et al. | 235/462.25 |
| 2003/0031382 A1* | 2/2003 | Broekaert | 382/286 |
| 2003/0090573 A1* | 5/2003 | Tojo | 348/207.2 |
| 2003/0098352 A1* | 5/2003 | Schnee et al. | 235/472.01 |
| 2004/0173683 A1* | 9/2004 | Bian et al. | 235/462.25 |
| 2005/0167498 A1* | 8/2005 | Ito et al. | 235/454 |
| 2007/0036405 A1* | 2/2007 | Lienard et al. | 382/128 |
| 2007/0297779 A1* | 12/2007 | Fujisaki et al. | 396/55 |
| 2008/0174799 A1* | 7/2008 | Higashiyama et al. | 358/1.9 |

* cited by examiner

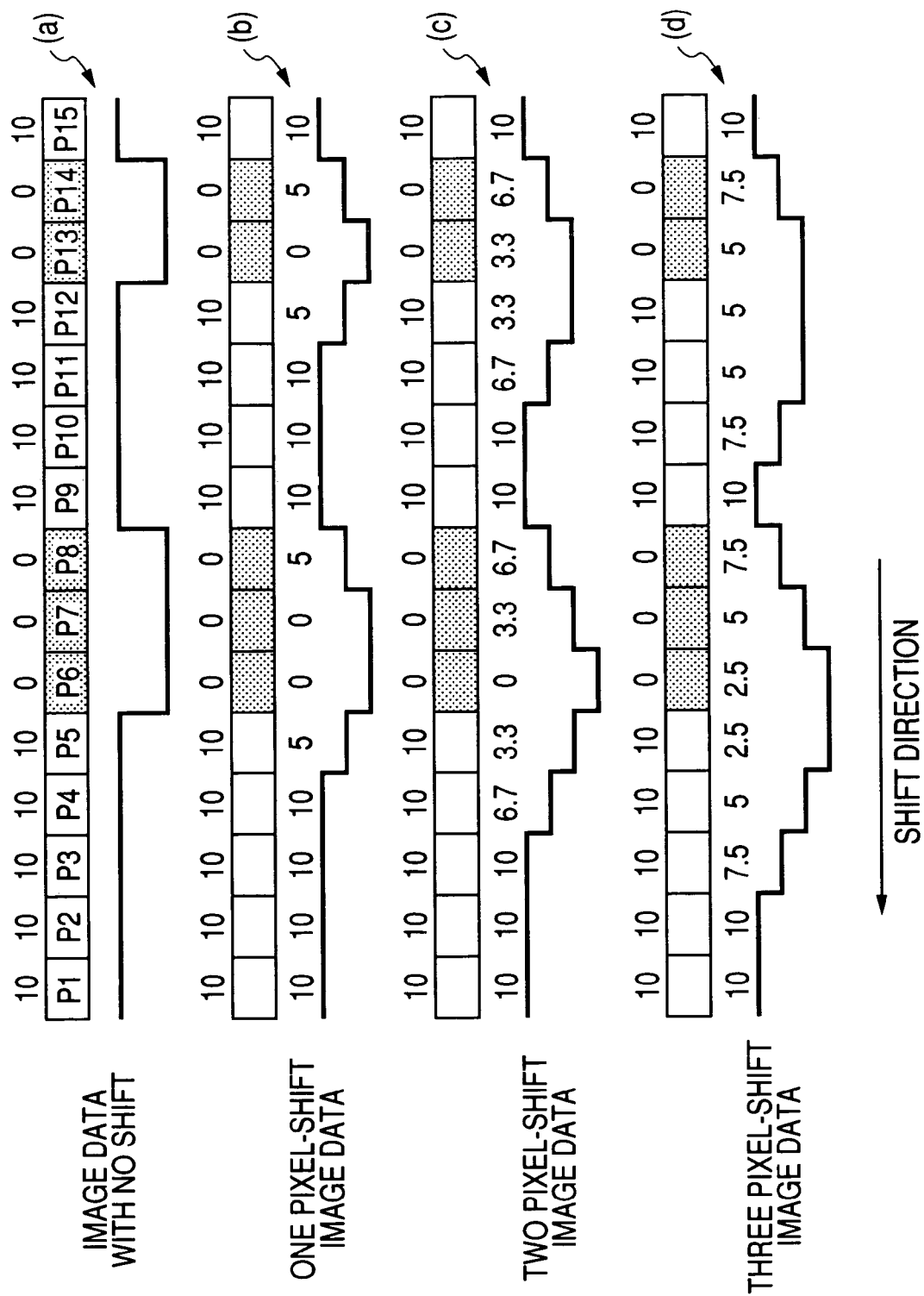

FIG. 9

METHOD AND APPARATUS FOR OPTICALLY PICKING UP AN IMAGE OF AN INFORMATION CODE

CROSS REFERENCE TO RELATED APPLICATION

This application is based on Japanese Patent Application 2004-002941 filed on Jan. 8, 2004. This application aims the benefit of priority from the Japanese Patent Application, so that the descriptions of which are all incorporated herein by reference.

BACKGROUND OF THE INVENTION

1. Field of the Invention

The present invention relates to a method and an apparatus for optically picking up an image of an optically readable information code, such as, a barcode or a two-dimensional code.

2. Description of the Related Art

Handheld optical information readers aim at reading an information code, such as a barcode, a two-dimensional code, or another similar code, that is composed of optically readable different colored (such as black-and-white) units (cells, bars, or the like) and is attached to a target, such as a label or a goods, by printing or other similar methods. In this specification, a target itself or a target to which optically readable information is attached is collectively referred to as "target".

For improving the usability of the handheld optical information readers, a type of handheld optical information readers that can read an information code positioned at a distance therefrom has been provided.

Such type of handheld optical information readers has a handheld body case provided at its one end portion with a reading window, a photodetector, such as a CCD (Charge-Coupled Device) area sensor, an imaging unit with an imaging lens, and a reading unit composed of a light illuminating device. The photodetector, the imaging unit, and the reading unit are installed in the body case, respectively.

In this type optical information reader) a user pushes a trigger switch attached to the handheld body case with the reading window of the handheld body case directed to a target, such as a barcode. The push of the trigger switch causes the light illuminating device to supply light through the reading window toward the target. The light supplied from the light illuminating device is irradiated to the target (barcode) so that light reflected from the target based on the irradiated light enters through the reading window into the imaging unit. The light entered into the imaging unit is focused on the photodetector by the imaging lens to be imaged thereon, so that an image corresponding to the target is picked up by the photodetector.

In this type optical information reader, handling of the optical information reader in user's hand(s) may cause the jiggle of the user's hand(s). In particular, when reading out a target to which an information code is attached at a location far from the information reader, the jiggle of the user's hand(s) with holding information reader may cause noises in the picked-up image; the noises may deteriorate the visibility of the picked-up image.

Regarding 'jiggle', in conventional digital cameras including digital video cameras, an image stabilizing function of decreasing the influence of the 'jiggle' on the picked-up image has been well known. Thus, it is considered to install such an image stabilizing function in conventional optical information readers.

First example of such a conventional digital camera in which an image stabilizing function is installed is disclosed in Japanese Unexamined Patent Publication No. 2003-57707.

This publication shows a digital camera having a pair of angular rate sensors, a group of correcting lenses, and an electromagnetic actuator. That is, the paired angular rate sensors detect the movement angle of the camera; the electromagnetic actuator makes the correcting lens group move in at least one of horizontal and vertical directions based on the detected movement angle of the camera.

Second example of such a conventional digital camera in which an image stabilizing function is installed is disclosed in Japanese Unexamined Patent Publication No. 2000-298300.

This publication shows an image stabilizing method including the steps of:

picking up an image of an object;

selecting at least two points in the picked-up image;

obtaining a special frequency distribution around each point of the picked-up image to estimate a moving direction thereof;

obtaining an autocorrelation function of adjacent areas of each point of the picked-up image along the moving direction to differentiate the autocorrelation function with respect to the moving direction, thereby estimating the magnitude of the movement of the picked-up image; and correcting the picked-up image based on the estimated moving direction of the picked-up image and the magnitude of the movement thereof.

In the first example, however, the digital camera is designed so that the electromagnetic actuator mechanically makes the correcting lens group move, which may cause the mechanism of the electromagnetic actuator and the control thereof to increase in complexity, resulting in an increase in cost of the digital camera.

In the second example, however, the image stabilizing method needs the special frequency distribution obtaining step and the autocorrelation function obtaining step, which may cause the image correcting method to increase in complexity and may require considerable time to complete the correction of the picked-up image.

SUMMARY OF THE INVENTION

The present invention is made on the background so that preferable embodiments of the invention each is capable of simplifying a structure of realizing an image stabilizing function of decreasing the influence of a 'jiggle'.

According to one aspect of the present invention, there is provided an apparatus having a photodetector with a plurality of pixels arranged in at least one dimension and designed to optically pick up an image of an information code by the pixels of the photodetector. The apparatus comprises: an establishing unit configured to establish a preliminary correcting region on part of image data based on the picked-up image; a preliminary correcting unit configured to provide a correcting variable that represents a shift amount of the image data; and preliminarily correct the part of the image data within the preliminary correcting region based on a value of the correcting variable. The determining unit is configured to determine whether the preliminary correction of the preliminary correcting unit is proper based on the corrected result. When the determining unit determines that the preliminary correction of the preliminary correcting unit is proper, a correcting unit is configured to correct the image data based on the value of the correcting variable.

According to another aspect of the present invention, there is provided a program product having a computer program and a signal bearing media bearing the computer program. The computer program is designed to optically pick up an image of an information code by pixels of a photodetector. The computer program comprises means for instructing a computer to establish a preliminary correcting region on part of image data based on the picked up image; provide a correcting variable that represents a shift amount of the image data; preliminarily correct the part of the image data within the preliminary correcting region based on a value of the correcting variable; determine whether the preliminary correction of the preliminary correcting unit is proper based on the corrected result; and when the determination determines that the preliminary correction of the preliminary correcting unit is proper, correct the image data based on the value of the correcting variable According to a further aspect of the present invention, there is provided a method of optically picking up an image of an information code by pixels of a photodetector with a plurality of pixels arranged in at least one dimension. The method comprises establishing a preliminary correcting region on part of image data based on the picked-up image; providing a correcting variable that represents a shift amount of the image data; and preliminarily correcting the part of the image data within the preliminary correcting region based on a value of the correcting variable. The method comprises determining whether the preliminary correction of the preliminary correcting unit is proper based on the corrected result; and when the determination determines that the preliminary correction of the preliminary correcting unit is proper, correcting the image data based on the value of the correcting variable.

BRIEF DESCRIPTION OF THE DRAWINGS

Other objects and aspects of the invention will become apparent from the following description of embodiments with reference to the accompanying drawings in which:

FIG. 4 is a view illustrating how a gray level of each pixel in image data is changed when the image data is shifted according to the first embodiment;

FIG. 9 is a view schematically illustrating correct data values obtained each time a value of variable number 'n' of pixels is changed assuming that the first image data is shifted by four pixels to the observer's right according to the second embodiment;

DETAILED DESCRIPTION OF EMBODIMENTS OF THE INVENTION

Embodiments of the present invention will be described hereinafter with reference to the accompanying drawings. In the embodiments, the invention is applied to a gun-shaped two-dimensional code reader.

First Embodiment

Figure 1:
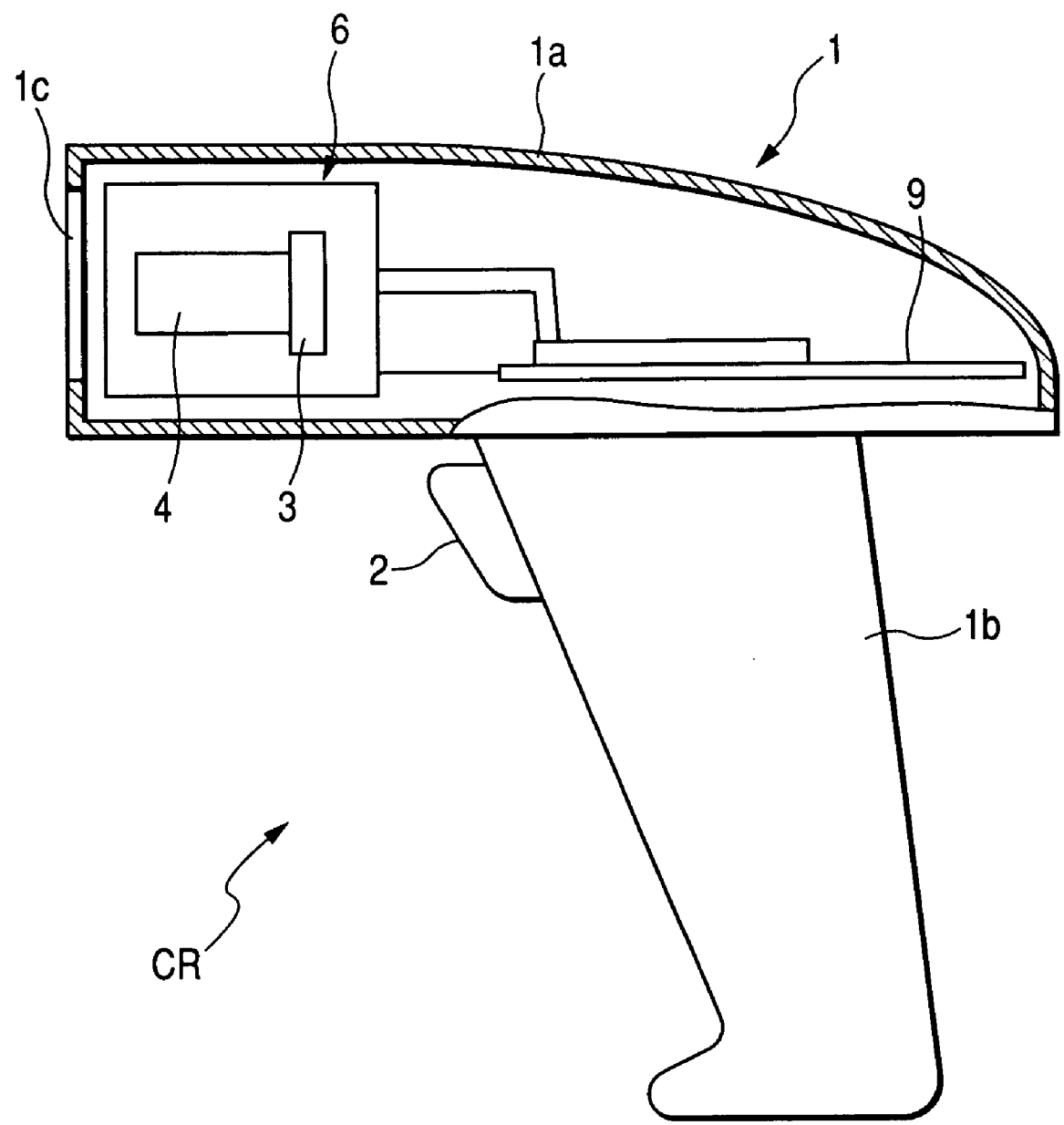
FIG. 1 is a partially cross sectional side view schematically illustrating a structure of a two-dimensional code reader according to a first embodiment of the present invention.
Figure 2:
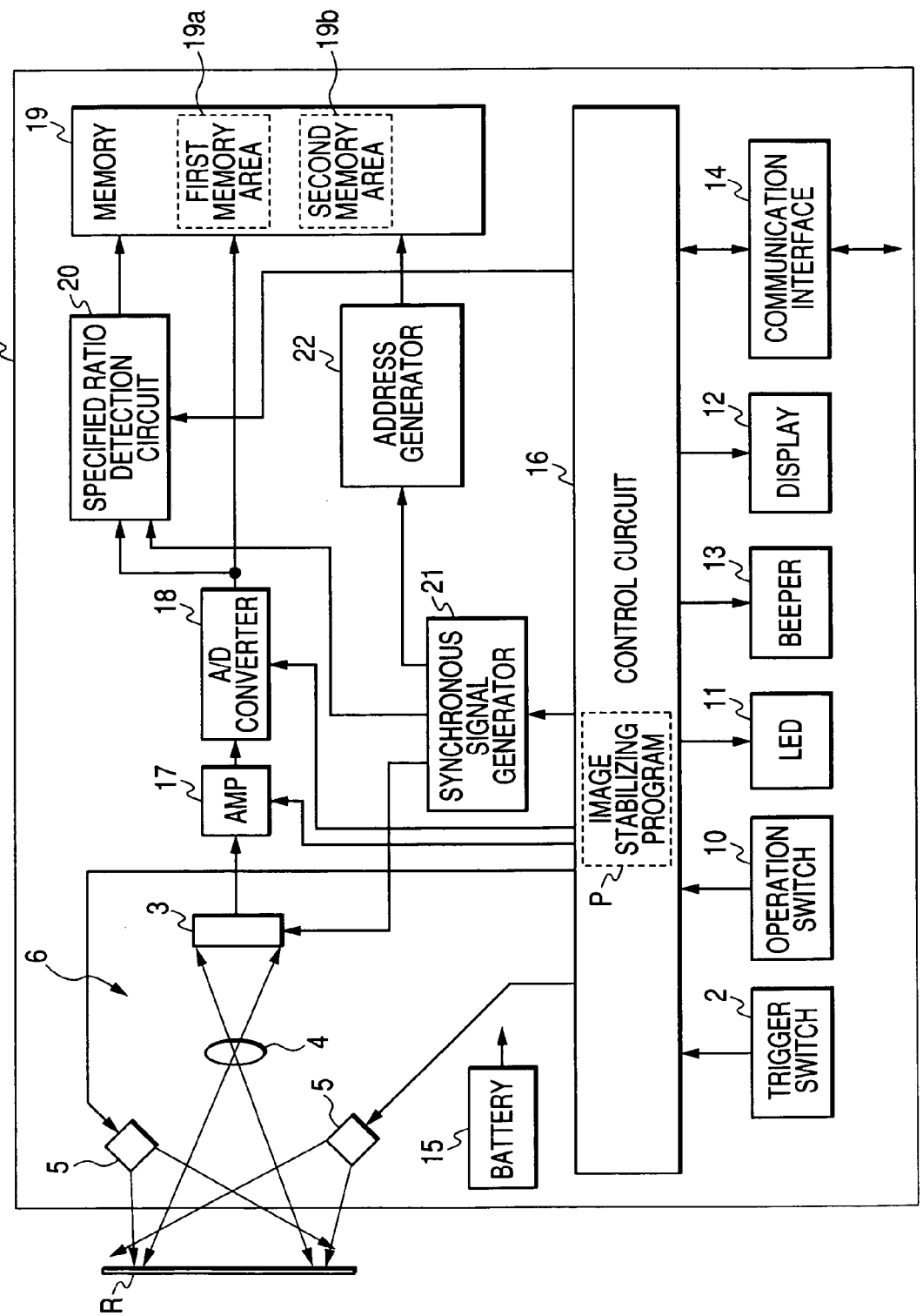
FIG. 2 is a block diagram schematically illustrating an electrical structure of the two-dimensional code reader according to the first embodiment.

FIG. 1 is a partially cross sectional side view schematically illustrating the structure of a gun-shaped two-dimensional code reader CR according to a first embodiment of the present invention; FIG. 2 is a block diagram schematically illustrating the electrical structure of the two-dimensional code reader CR according to the first embodiment.

As shown in FIG. 1, the two-dimensional code reader CR as an apparatus for optically reading a target according to a first embodiment of the present invention is provided with a gun-shaped housing 1. The gun-shaped housing 1 has, for example, a thin rectangular parallelepiped main body 1a. One lateral end portion of the main body 1a is rounded.

The gun-shaped housing 1 is provided at one side (specifically, bottom side in FIG. 1) of the one lateral end portion of the main body 1a with a grip portion 1b. The grip portion 1b is integrally formed to the main body 1a. The grip portion 1b allows a user to easily grip the two-dimensional code reader CR in one hand and handle it.

The main body 1a is formed at a lateral surface of the other lateral end portion with a reading window 1c having, for example, a rectangular shape and translucency. The two-dimensional code reader. CR is also provided with a trigger switch 2. The trigger switch 2 is disposed to one side surface of the grip portion 1b and directed to the reading window 1c. The trigger switch 2 permits a user to instruct a reading operation to the two-dimensional code reader CR.

The two-dimensional code reader CR is provided with a reading mechanism (optical reading mechanism) 6 disposed in the other lateral end portion of the housing 1. In the first embodiment, the other lateral end portion of the housing 1 is referred to AS "head portion".

The reading mechanism 6 is operative to read a two-dimensional code, such as a QR code, written on a target R (see FIG. 2) by printing or other similar methods. The target R includes a label that is a piece of paper or another media. The target R can be attached on goods, which is the same as general barcodes. The two-dimensional code includes information, such as, a manufactures serial number, a name, a unique identification number and a date of manufacture of the goods.

In recent years, the target R includes the screen of a display, such as a liquid crystal display (LCD) in a computer terminal, such as a cellular phone or a PDA (Personal Digital Assistant); a two-dimensional code is displayed on the screen of the display.

For example, the two-dimensional code consists of different color cells, such as black and white cells arranged in a matrix. The different color cells include a data area consisting of data cells to represent the information. The different color cells also include specified patterns consisting of the remaining cells for indicating the orientation of the two-dimensional code and the positions of the data cells.

One of the black and white colors corresponds to one of bit values "0" and "1", and the other of the black and white colors to the other of bit values "0" and "1". After reading the cells, it is possible to easily binarize the read color data to decode it.

As schematically illustrated in FIGS. 1 and 2, the reading mechanism 6 includes a photodetector 3, an imaging lens 4 constituting an imaging optics, and a pair of light illuminating devices 5, which is not shown in FIG. 1).

The photodetector 3 is composed of, for example, a CCD area sensor. The photodetector 3 is located at the center of the head portion of the main body 1a. The photodetector 3 has an active area (light sensitive pixel area) composed of a plurality of, for example, approximately 330,000 pixels arranged vertically and horizontally in matrix. The exposure time, that is, the shutter speed of the photodetector 3, can be externally controlled.

The photodetector 3 also has a predetermined optical axis. The photodetector 3 is arranged so that its pixel area is parallely opposite to the reading window 1c of the main body 1a and its optical axis passes through the center of the reading window 1c.

The imaging lens 4 has a body tube and a plurality of lens elements that are disposed coaxially therein. The imaging lens 4 has a total predetermined optical axis. The imaging lens 4 is arranged so that its total optical axis extends orthogonally with the head end surface, which is formed with the reading window 1c, of the main body 1a. That is, the reading window 1c, the photodetector 3 and the imaging lens 4 are coaxially arranged with one another in the main body 1a, Each of the light illuminating devices 5 is disposed around the imaging lens 4 thereof (see FIG. 2). That is, each of the light illuminating devices 5 is provided with a light emitting device (LED) serving as a light source. Each of the light illuminating devices 5 is also provided with a light lens disposed between each light emitting device and the reading window 1c. An optical axis of each light lens is directed to the reading window 1c.

That is, when the reading window 1c of the code reader CR is positioned to be opposite to the target R on which the two-dimensional code is written, illuminating light emitted from each of the light illuminating devices 5 is irradiated through the reading window 1c to the two-dimensional code Q. Light reflected from the two-dimensional code is entered through the reading window 1c into the imaging lens 4. The reflected light entered into the imaging lens 4 is focused on the pixel area of the photodetector 3 by the imaging lens 4, so that an image consisting of light intensities of the reflected light corresponding to the target R is picked up by the photodetector 3.

In addition, the two-dimensional code reader CR is provided with a circuit board 9 disposed in the main body 1a at its one lateral end portion side, specifically backside opposite to the head side. In the circuit board 9, electrical components of the code reader CR are installed (see FIG. 2). As illustrated in FIG. 2, the two-dimensional code reader CR is provided with an operation switch 10, an LED (light emitting device) 11, a liquid crystal display 12, a beeper 13, and a communication interface 14, which are disposed to the other side of the one lateral end portion of the main body 1a, respectively. The operation switch 10 allows a user to input various instructions to the code reader CR. The LED 11 is operative to visually indicate information to send notice to a user. The beeper 13 is operative to emit a series of beeps to send notice to a user. The communication interface 14 allows the code reader CR to communicate with external devices.

On the other hand, the two-dimensional code reader CR is provided with a battery 15 as a power supply for activating the above optical devices 3, 5, 6, the electrical components installed in the circuit board 9, and the above I/O devices 2, 10-14, respectively.

As shown in FIG. 2, in the circuit board 9, a control circuit 16 composed of at least one microcomputer is provided. The microcomputer is composed of, for example, a CPU (Central Processing Unit), an internal memory unit including a ROM (Read Only Memory), a RAM (Random Access Memory) and the like, and peripherals) is provided. The control circuit 16 operates on power supplied from the battery 15. The control circuit 16 runs in accordance with programs including an image stabilizing program P stored in the internal memory unit to control the whole of the two-dimensional code reader CR to perform a decoding process, an image stabilizing process, and other processes. The programs can be loaded from a signal bearing media to the internal memory unit. Examples of suitable signal bearing media include recordable type media such as floppy disks and CD (Compact Disk)-ROM, and transmission type media such as digital and analog communications links.

The control circuit 16 is communicably coupled to the trigger switch 2 and the operation switch 10 so that the commands sent from the switches 2 and 10 are inputted to the control circuit 16. The control circuit 16 is communicably coupled to the photodetector 3 and the light illuminating devices 5, respectively. That is, the control circuit 16 operates to control the photodetector 3 and the light illuminating devices 5 to execute reading processes of the two-dimensional code written on the target R. The control circuit 16 is also communicably coupled to the LED 11, the beeper 13, and the liquid crystal display 12 to control them. Moreover, the control circuit 16 is communicably coupled to the communication interface 14 to communicate with external devices through the communication interface 14.

Specifically, the control circuit 16 is operative to control the exposure time (the shutter speed) of the photodetector 3.

Furthermore, in the circuit board 9, an amplifier (AMP) 17, an analog to digital (A/D) converter 18, a memory 19, a specified-ratio detection circuit 20, a synchronous signal generator 21, and an address generator 22 are installed so that they are communicably coupled to the control circuit 16, respectively.

The amplifier 17 is electrically connected to the photodetector 3 and operative to amplify an image signal sequentially outputted from the photodetector 3 at a gain based on a gain control signal transmitted from the control circuit 16. The A/D converter 18 is electrically connected to the amplifier 17 and operative to convert the amplified image signal into digital data (pixel data), which is represented as, for example, 8 bits (1 byte), of each pixel of the light sensitive pixel area of the photodetector 3.

Specifically, the pixel data of each pixel in photodetector's light sensitive pixel area takes a gray level within the range of 256 levels of gray from 0 to 255. The level 0 of gray represents the minimum gray level, that is, the zero level intensity (brightness) of light corresponding to the one of the colors black and white. The level 255 of gray represents the maximum gray level, that is, the full level intensity (brightness) of light corresponding to the other thereof.

The synchronous signal generator 21, for example, periodically generates a synchronous signal to periodically output it to the photodetector 3, the specified ratio detection circuit 20, and the address generator 22 under the control of the control circuit 16.

The address generator 22 periodically counts a number of the transmitted synchronous signals to generate address signals in response to the count result, thereby outputting the address signals to the memory 19.

That is, the digital data sequentially sent from the A/D converter 18 is stored in the memory 19 so as to correspond to the outputted address signals as first image data.

In the first embodiment, the memory 19 has a first memory area 19*a* prepared for storing the first image data picked-up by the photodetector 3 and a second memory area 19*b* prepared for storing second image data that is stabilized by subjecting the first image data to the image stabilizing process described hereinafter.

The specified-ratio detection circuit 20 is operative to detect the specified patterns (bit patterns) in the first image data in response to the synchronous signals based on the control of the control circuit 16. The control circuit 16 identifies the orientation of the two-dimensional code in the first image data and the positions of the data cells in the first image data based on the detected specified patterns.

In addition, in the first embodiment, the control circuit 16 runs the image stabilizing program P to:

determine whether the first image data shifts depending on the movement (jiggle) of the code reader CR; and subject the first image data to the image stabilizing process to generate the second image data when determining that the first image data moves depending on the movement of the code reader CR.

As an example of determining whether the first image data moves depending on the movement of the code reader CR, the control circuit 16 determines whether the first image data is accurately decodable based on a decoding quality level. The decoding quality level can be determined depending on the configuration of the two-dimensional code written on the target R, which allows determination of whether the first image data is accurately decodable.

Specifically, in the first embodiment, the two-dimensional code has error correcting codes, such as Reed Solomon codes, which allow the control circuit 16 to accurately decode the two-dimensional code even if it is difficult to binarize pixel data corresponding to up to 30% of the data area (data cells) therein. The reason of the difficulty of binarization is that up to 30% of the data area (data cells) in the two-dimensional code is not identified to the black or white due to the movement of the code reader CR and so on.

That is, the level of 30% serves as the decoding quality level of the two-dimensional code.

If a barcode is written on the target R in place of the two-dimensional code, the control circuit 16 determines that the barcode is accurately decodable as long as the barcode is binarized so that the bar width ratio of the barcode substantially equals to a predetermined ratio of, for example, 4:1. The bar width is defined as the ratio between the widest bar or space and the narrowest one.

That is, the predetermined ratio serves as the decoding quality level of the barcode.

When determining that the first image data is inaccurately decodable based on the decoding quality level, the control circuit 16 determines that the first image data moves depending on the movement of the code reader CR, the control circuit 16 executes the image stabilizing process to generate the second image data.

Specifically, the control circuit 16 is configured to:

establish a preliminary correcting region on part of the first image data stored in the first memory area 19*a* of the memory 19, which corresponds to part of the field of view F of the photodetector 3;

provide a correcting variable that represents a shift amount of the first image data for correcting the movement of the first image data;

while adjusting the value of the correcting variable, preliminarily correct the gray level of each pixel within the preliminary correcting region in the first image data based on every adjusted value of the correcting variable;

determine which preliminary corrections corresponding to the adjusted values of the correcting variable is proper based on the corrected results;

when one of the preliminary corrections is proper, correct the gray level of each pixel in the first image data based on one of the adjusted values of the correcting variable, which corresponds to the one of the preliminary corrections; and storing the obtained correct data value of each pixel in the first image data in the second memory area 19*b* as the second image data.

Subsequently, the control circuit 16 compares the correct data value of each pixel in the second image data with the threshold value to binarize it based on the compared result, thereby decoding the binarized data.

In the first embodiment, the control circuit 16 therefore preferably serves as an establishing unit, preliminary correcting unit, a preliminarily correcting unit, a determining unit, and a correcting unit.

Specifically, the preliminary correcting region is preferably set on the center portion of the first image data, which corresponds to the field of view F of the photodetector 3.

For example, the preliminary correcting region is designed to detect a shift of the first image data in two dimensional directions each orthogonal to the optical axis of the reading mechanism 6.

Figure 3A:
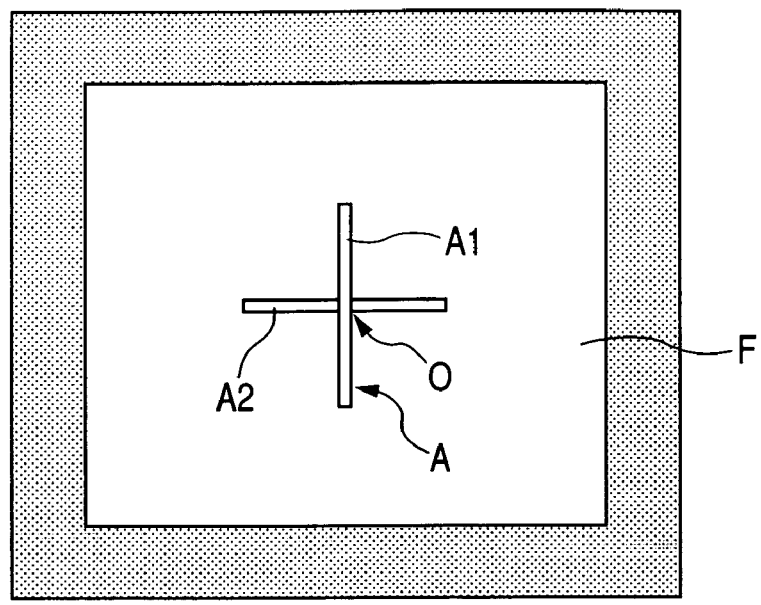
FIG. 3A is a view schematically illustrating a preliminary correcting region established on the center portion of a first image data, which corresponds to the center portion of a field of view of a photodetector shown in FIGS. 1 and 2.
Figure 3B:
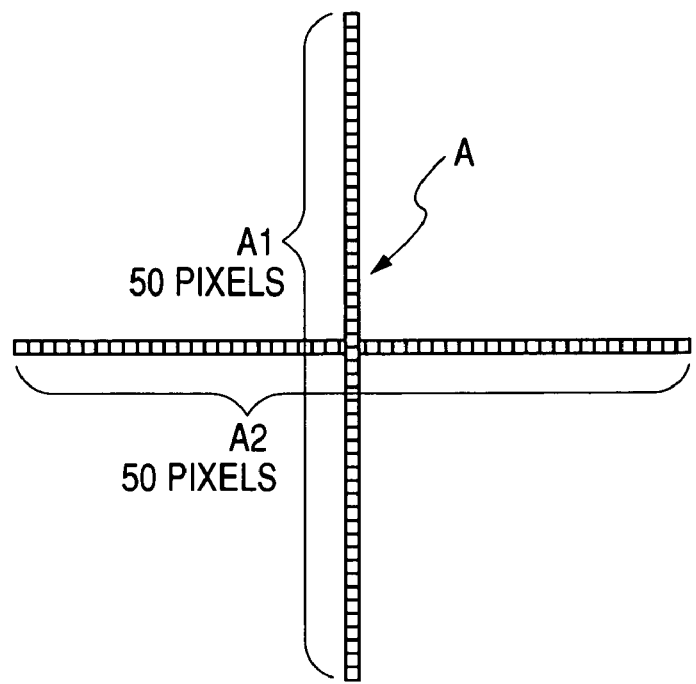
FIG. 3B is an enlarged view of the preliminary correcting area illustrated in FIG. 3A.

FIG. 3A is a view schematically illustrating the preliminary correcting region A established on the center portion of the first image data, which corresponds to the center portion of the field of view F of the photodetector 3. FIG. 3B is enlarged view of the preliminary correcting area A illustrated in FIG. 3A.

As shown in FIGS. 3A and 3B, the preliminary correcting area A is composed of a vertical pixel line A1 and a horizontal pixel line A2. The vertical pixel line A1 passes through the predetermined position of the first image data, which corresponds to the center 0 of the field of view F, along the vertical scan line of the pixel area of the photodetector 3. Similarly, the horizontal pixel line A2 passes through the predetermined position of the first image data, which corresponds to the center 0 of the field of view F, to be orthogonal to the vertical pixel line A1 along the horizontal scan line of the pixel area of the photodetector 3.

Each of the vertical and horizontal pixel lines A1 and A2 consists, of dozens of pixels, such as 50 pixels, to be symmetrical about the predetermined position in the first image data, which corresponds to the center 0 of the field of view F, that is, the intersection point between the lines A1 and A2.

The control circuit 16 is operative to carry out the correct data value obtaining process with respect to the vertical and horizontal pixel lines A1 and A2, respectively.

Specifically, as set forth above, the control circuit 16 provides, as the value of the correcting variable, the variable number 'n' of pixels corresponding to shift pixels of the first image data. While changing the variable number 'n' of pixels, the control circuit obtains the correct data value of each pixel of each of the vertical and horizontal pixel lines A1 and A2 in the first image data every changed variable number 'n' of pixels.

In the first embodiment, the number of the total pixels of each of the vertical and horizontal pixel lines A1 and A2 is represented as "M", such as 50 pixels. The pixel data of each pixel of each of the vertical and horizontal pixel lines A1 and A2 in the first image data, that is, the 8-bit gray level of each pixel thereof, is represented as D(x). The "x" represents the location (address) of each pixel of each of the vertical and horizontal pixel lines A1 and A2 in the first image data In the first embodiment, the number of the total pixels of the pixel lines A1 and A2 is referred to as "M, and the correct data value of each pixel of each of the pixel lines A1 and A2 in the first image data is referred to as D'(x) (x=1, 2, ..., M).

Using the number M of the total pixels of the pixel lines A1 and A2 and the 8-bit gray level D(x) of each pixel thereof allows the correct data value D'(x) of each pixel of each of the pixel lines A1 and A2 in the first image data to be represented as the following equation [1]:

$$D'(x) = (n+1)D(x) - \sum_{a=x+1}^{x+n} D'(a) \quad [1]$$

$$\text{where} \sum_{a=M+1}^{M+n} D'(a) = \text{constant.}$$

In addition, in the first embodiment, as an example of the determination process of which preliminary corrections based on the adjusted values of the correcting variable is proper, the control circuit 16 is configured to:

(a) set the variable number 'n' of pixels to an initial value, that is, "1";

(b) obtain a correct data value of each pixel of each of the vertical and horizontal pixel lines A1 and A2 in the first image data based on the variable number 'n' of pixels;

(c) binarize the obtained correct data value of each pixel of each of the vertical and horizontal pixel lines A1 and A2 in the first image data;

(d) determine the binarized correct data value of each pixel of each of the vertical and horizontal pixel lines A1 and A2 in the first image data is accurately decodable based on the decoding quality level;

(e) when determining that the binarized correct data value of each pixel of each of the vertical and horizontal pixel lines A1 and A2 in the first image data is not accurately decodable, increment the variable number 'n' of pixels by 1; and repeat the operations (b) to (f) unless the binarized correct data value of each pixel of each of the vertical and horizontal pixel lines A1 and A2 in the first image data is accurately decodable in the operation of (e).

Moreover, in the first embodiment, when the variable number 'n' of pixels reaches an upper limit value of K, such as the M of the number of the total pixels of each of the pixel lines A1 and A2 during the repeated operations (b) to (f), the control circuit 16 controls at least one of the beeper 13 and the crystal liquid display 12 to send notice indicative of the failure of the image stabilizing process.

For example, the beeper 13 and/or the crystal liquid display 12 preferably serve as a notice sending unit.

Next, the operations of the two-dimensional code reader CR according to the first embodiment will be described hereinafter in accordance with FIGS. 4-7.

When a user wants to read the two-dimensional code written on the target R, the user handles the code reader CR in, for example, one hand to make locate the code reader CR so that the reading window 1c is opposite to the target R and away therefrom at an arbitrary distance.

While the code reader CR is arranged in such a state, the user moves the code reader CR to a position where the two-dimensional code is located as much as possible to the center 0 of the field of view F of the photodetector 3. After the location, the user operates the trigger switch 2 to turn it on.

When handling the code reader CR in user's hand(s), the jiggle of the user's hand(s) may occur. The jiggle of the user's hand(s) with holding code reader CR may cause the movement (shift) of the first image data picked-up by the photodetector 3 and stored in the first memory area 19a of the memory 19.

FIG. 4 is a view illustrating how a gray level of each pixel in image data is changed when the image data is shifted. In FIG. 4, as the image data, a horizontal pixel line consisting of 15 pixels (M=15). Addresses P1, P2, ..., P15 are ascending sequentially assigned from one end pixel, that is, the leftmost pixel up to the other end pixel, that is, the rightmost pixel, respectively.

In FIG. 4, (a) shows the image data with no shift, and (b) shows the image data horizontally shifted by one pixel to the one end pixel, referred to as "one-pixel shift image data". In addition, (c) shows the image data horizontally shifted by two pixels to the one end pixel, referred to as "two-pixel shift image data", and (d) shows the image data horizontally shifted by three pixels to the one end pixel, referred to as "three-pixel shift image data". In the first embodiment, to make the description of the image data easy, in each of the (a) to (d), the black pixels represent the gray level of "0" corresponding to the minimum gray level, and the white pixels represent the gray level of "10" corresponding to the maximum gray level, respectively.

Because the information code, such as the two-dimensional code, is composed of different colored (such as black-and-white) cells, the jiggle of the code reader 1 during the pickup of the image data corresponding to the information code appears as a shift of the image data, that is, specific changes of gray levels of pixels of the photodetector corresponding to the image data.

Specifically, as shown in the (b) of FIG. 4, when the image data is horizontally shifted by one pixel to the one end pixel, the gray level of each pixel of the image data is influenced from that of the right adjacent thereof so that they are averaged with each other. Each of the averaged values corresponds to each of the gray levels of each pixel of the one-pixel shift image data. For example, when the image data is horizontally shifted by one pixel to the one end pixel, the gray level "10" of the pixel P5 in the image data is affected from the gray level "0" of the pixel P6. This results in that the gray level of the pixel P5 in the one-pixel shift image data can be calculated by the equation of "(0+10)/2". Similarly, the gray level of the pixel P8 in the one-pixel shift image data can be calculated by the equation of "(10+0)/2".

As shown in the (c) of FIG. 4, when the image data is horizontally shifted by two pixels to the one end pixel, the gray level of each pixel of the image data is influenced from the gray levels of two pixels right adjacent thereof so that they are averaged with one another. Each of the averaged values corresponds to each of the gray levels of each pixel of the two-pixel shift image data. For example, when the image data is horizontally shifted by two pixels to the one end pixel, the gray level "10" of the pixel P5 in the image data is affected from the gray levels "0" and "0" of the two pixels P6 and P7 right adjacent to the pixel P5. This results in that the gray level of the pixel P5 in the two-pixel shift image data can be calculated by the equation of "(10+0+0)/3", which is approximately equal to "3.3".

As shown in the (d) of FIG. 4, when the image data is horizontally shifted by three pixels to the one end pixel, the gray level of each pixel of the image data is influenced from the gray levels of three pixels right adjacent thereof so that they are averaged with one another. Each of the averaged values corresponds to each of the one end pixel of each pixel of the three-pixel shift image data. For example, when the image data is horizontally shifted by three pixels to the one end pixel, the gray level "10" of the pixel PS in the image data is affected from the gray levels "0", "0", and "0" of the three pixels P6, P7, and P8 right adjacent to the pixel P5. This results in that the gray level of the pixel P5 in the three-pixel shift image data can be calculated by the equation of "(10+0+0+0)/4", which is approximately equal to "2.5".

This relationships between such shifted image data and the image data with no shift makes it possible to correct such shifted image data to obtain the image data with no shift.

That is, identifying the shift amount, that is, the number of pixels of the image data to be shifted and performing the reverse of the calculations for obtaining the average values based on the identified number of pixels to be shifted allows the image data with no shift to be obtained.

This proves that the equation [1] allows the correct data value D'(x) to be obtained.

For example, in the (d) of FIG. 4, the gray level 2.5 of the pixel P5 of the three-pixel shift image data corresponds to the "D(x)" in the equation [1], and the three of pixels to be shifted corresponds to the "n" therein, so that the correct data value D'(P5) is obtained as follows:

$$D'(P5) = (3+1) \times 2.5 - \{D'(P6) + D'(P7) + D'(P8)\}$$
$$= 4 \times 2.5 - (0 + 0 + 0)$$
$$= 10$$

The correct data value D'(x) of "10" is equal to the gray level of the pixel P5 of the image data with no shift.

Incidentally, the equation [1] means that it is necessary for the correct data values D'(x+1), ..., D'(X+n) to exist in order to obtain the correct data value D'(x).

In regard to this point, as shown in FIG. 4, it may be difficult to obtain the correct data value D'(x=P15=M), that is the rightmost pixel, if no correct data values D'(M+1), ..., D'(M+n) exist.

In the first embodiment, therefore, the equation of $$\text{``} \sum_{a=M+1}^{M+n} D'(a) = \text{constant''}$$

allows the correct data values D'(M+1), ..., D'(M+n), each of which can take one of the gray level of "0" corresponding to the minimum gray level and the gray level of "10" corresponding to the maximum gray level, to virtually exist.

It is preferable to set the correct data values D'(M+1), ..., D'(M+n) to one of the minimum gray level and the maximum gray level so that, if the gray level of D(x) is unequal to the minimum gray level, the correct data value D'(M) is the maximum gray level; if the gray level of D(x) is equal to the minimum gray level, the correct data value D'(M) is the minimum gray level.

Figure 5:
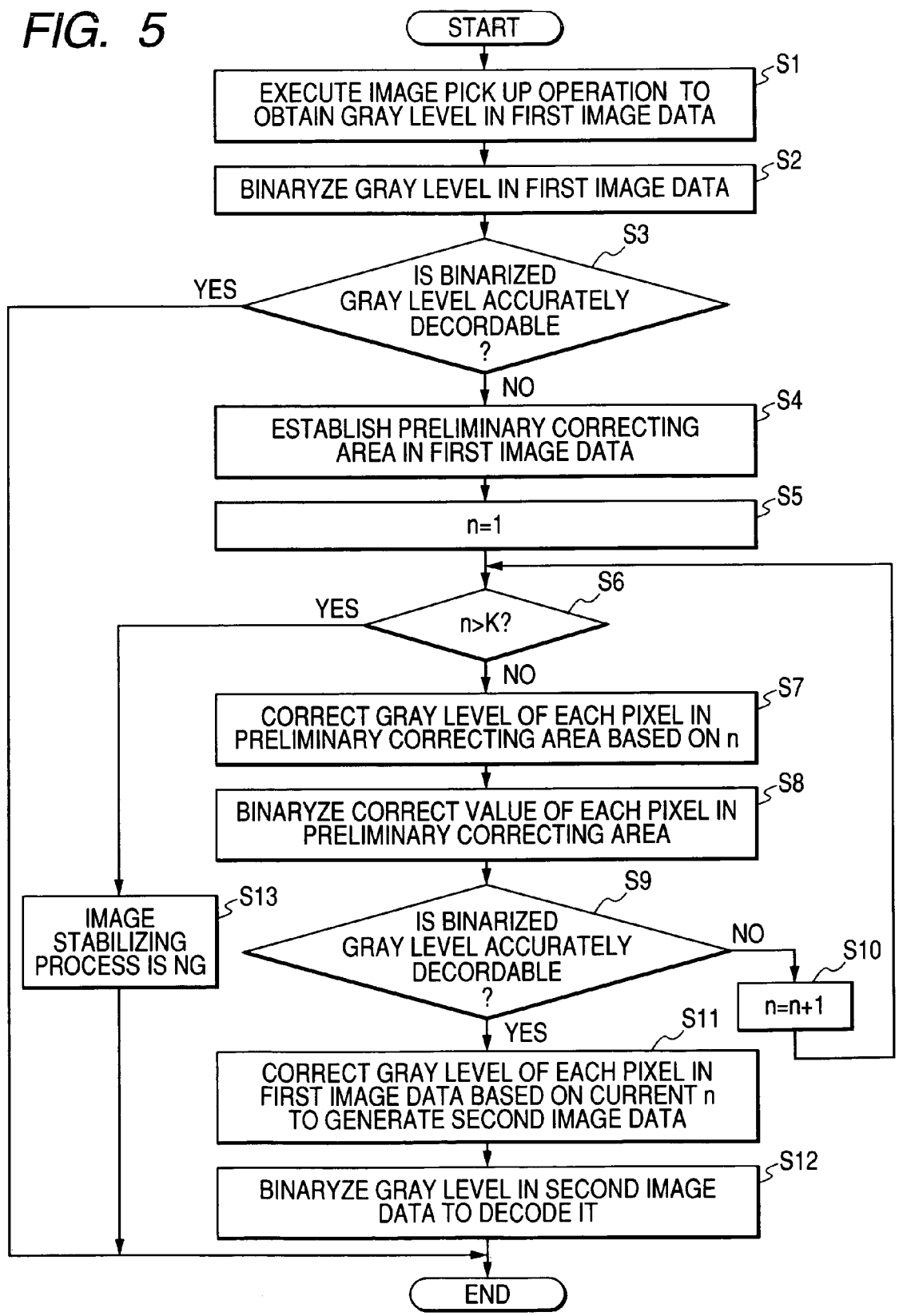
FIG. 5 is a flowchart indicative of operations for reading out a two-dimensional code executed by the control circuit in response to a turn-on operation of a trigger switch according to the first embodiment.

FIG. 5 is a flowchart indicative of the operations for reading out the two-dimensional code executed by the control circuit 16 in response to the turn-on operation of the trigger switch 2.

As shown in FIG. 5, when the trigger switch 2 is turned on by the user, in step S1, the control circuit 16 turns each of the light illuminating devices 5 on to expose the photodetector 3 based on a predetermined shutter speed (exposure time) The operation causes the photodetector 3 to pick up the image of the two-dimensional code of the target R on which the illuminating light is irradiated.

This results in that light reflected from the two-dimensional code of the target R based on the illuminating light is imaged on the pixel area of the photodetector 3. The image of the two-dimensional code, therefore, is picked up by the photodetector 3.

The picked up image is converted into the pixel data (8-bit gray level) by the amplifier 17 and the A/D converter 18 so that the pixel data (8-bit gray level) corresponding to the two-dimensional code is stored in the first memory area 19a as the first image data.

In step S2, the control circuit 16 collaborates with the specified-ratio detection circuit 20 to identify the 8-bit gray level of each pixel in the first image data, thereby binarizing the 8-bit gray level of each pixel in the first image data. Subsequently, the control circuit 16 determines whether the binarized 8-bit gray level of each pixel in the first image data is accurately decodable based on the decoding quality level in step S3.

When the control circuit 16 determines that the binarized 8-bit gray level of each pixel in the first image data is accurately decodable based on the decoding quality level, the determination in step S3 is YES. Then, the control circuit 16 decodes the binarized 8-bit gray level of each pixel in the first image data, terminating the readout operations of the two-dimensional code When determining that the binarized 8-bit gray level of each pixel in the first image data is not accurately decodable based on the decoding quality level, that is, the determination in step S3 is NO, the control circuit 16 shifts to step S4.

In step S4 and subsequent steps therefrom, the control circuit 16 performs the image stabilizing process in accordance with the image stabilizing program P.

That is, the control circuit 16 establishes, as the preliminary correcting region A, the vertical pixel line A1 and the horizontal pixel line A2 on part of the first image data stored in the first memory area 19a of the memory 19, which corresponds to the center portion of the field of view F of the photodetector 3. As set forth above, each of the vertical and horizontal pixel lines A1 and A2 consists of dozens of pixels, such as 50 pixels so as to be symmetrical about the predetermined position in the first image data.

Subsequently, the control circuit 16 sets the variable number 'n' of pixels to an initial value, that is, "1" in step S5. Next, the control circuit 16 determines whether the variable number 'n' of pixels exceeds, as a predetermined upper limit value K, the number M of the total pixels of each of the vertical and horizontal pixel lines A1 and A2 in step S6.

When the control circuit 16 determines that the current value of the variable number 'n' of pixels does not exceed the predetermined upper limit value K, the determination in step S6 is NO. The control circuit 16 obtains the correct data value of each pixel of each of the vertical and horizontal pixel lines A1 and A2 in the first image data based on the variable number 'n' of pixels in step S7.

Specifically, in step S7, the control circuit 16 obtains the correct data value D'(x) (x=1, . . . , 50) of each pixel of each of the vertical and horizontal pixel lines A1 and A2 in the first image data based on the 8-bit gray level D(x) (x=1, . . . , 50) thereof, the current value of the variable number 'n' of pixels and the equation [1].

In step S8, the control circuit 16 binarizes the obtained correct data value D'(x) of each pixel of each of the vertical and horizontal pixel lines A1 and A2 in the first image data. Subsequently, in step S9, the control circuit 16 determines whether the binarized correct data value D'(x) of each pixel of each of the vertical and horizontal pixel lines A1 and A2 in the first image data is accurately decodable based on the decoding quality level.

When the control circuit 16 determines that the binarized correct data value D'(x) of each pixel of each of the vertical and horizontal pixel lines A1 and A2 in the first image data is not accurately decodable based on the decoding quality level, the determination in step S9 is NO. Then, the control circuit 16 increments the current value of the variable number 'n' of pixels by 1 in step S10, shifting to step S6.

That is, the control circuit 16 repeats the operations from step S6 to step S10 based on the incremented variable number 'n' of pixels unless it is determined that the binarized correct data value D'(x) of each pixel of each of the vertical and horizontal pixel lines A1 and A2 is accurately decodable based on the decoding quality level in step S9.

When the control circuit 16 determines that the binarized correct data value D'(x) of each pixel of each of the vertical and horizontal pixel lines A1 and A2 in the first image data is accurately decodable based on the decoding quality level, the determination in step S9 is YES.

Figure 6:
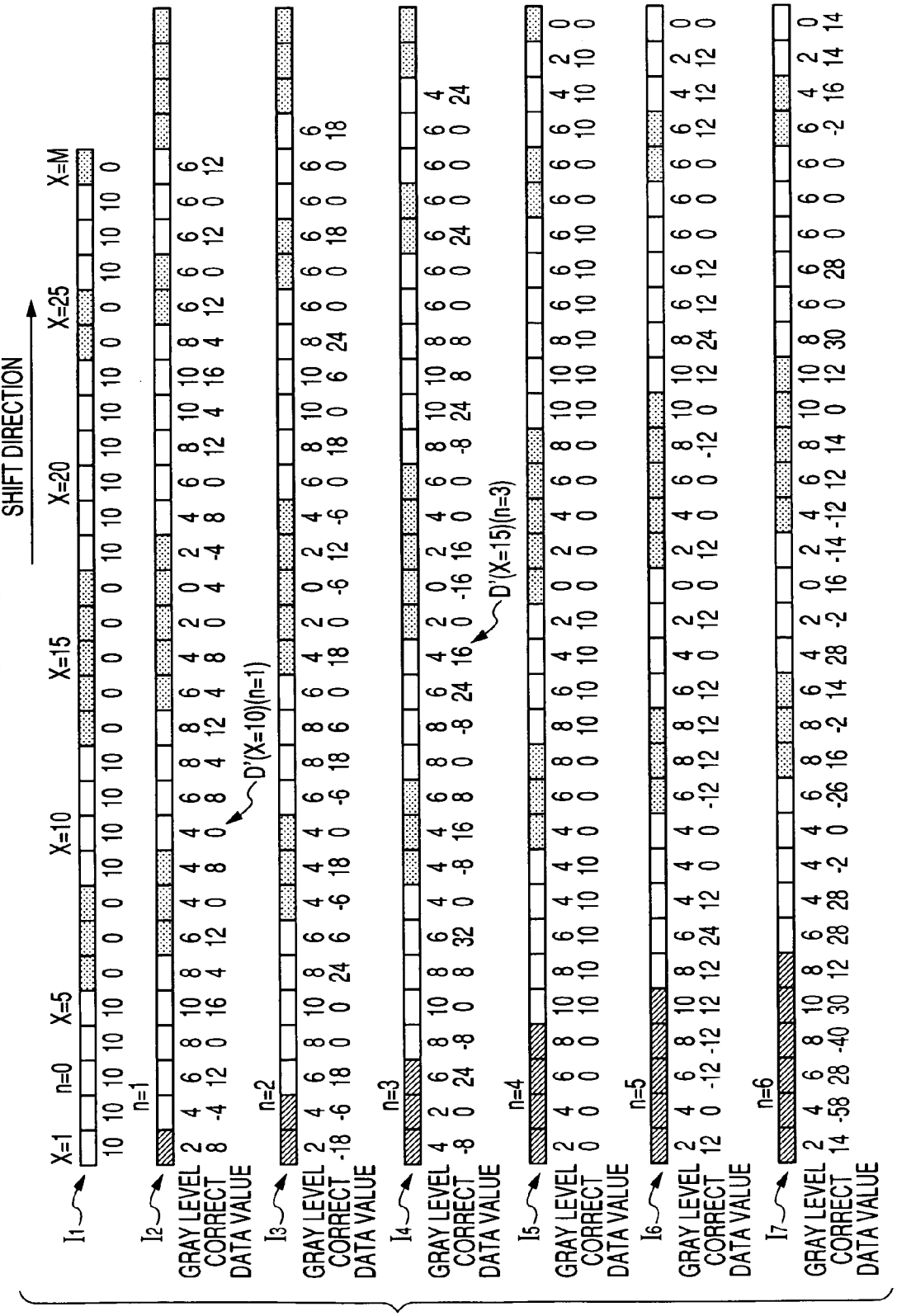
FIG. 6 is a view schematically illustrating correct data values obtained each time a variable number 'n' of pixels from "1" to "6" is changed assuming that the first image data is shifted by four pixels to the observer's right according to the first embodiment.

FIG. 6 is a view schematically illustrating the correct data values D'(x) obtained each time the variable number 'n' of pixels from "1" to "6" is changed assuming that the first image data is shifted by four pixels to the other end pixel (observer's right).

Incidentally, in FIG. 6, the horizontal pixel line A2, for example, consists of 29 pixels (M=29). Addresses x=1, x=2, . . . , x=29 are ascending sequentially assigned from one end pixel, that is, the leftmost pixel up to the other end pixel, that is, the rightmost pixel, respectively. To make the description of the first image data easy, the black pixels represent the gray level of "0" corresponding to the minimum gray level, and the white pixels represent the gray level of "10" corresponding to the maximum gray level, respectively.

First, when the first image data is shifted by four pixels to the other end pixel, the gray level of the pixel (x=1) is calculated by the equation of "(0+0+0+0+10)/(4+1)", which equals to "2". The gray levels of the pixels (x=2, 3, . . . , 10) are calculated by the equations of "(0+0+0+10+10)/5", "(0+0+10+10+10)/5", "(0+10+10+10+10)/5", "(10+10+10+10+10)/5", "(10+10+10+10+0)/5", "(10+10+10+0+0)/5", "(+10+10+0+0+0)/5", "(10+0+0+0+10)/5", and "(0+0+0+10+10)/5", Thus results in that the gray levels of the pixels (x=1, 2, . . . , 10) equal to (2, 4, 6, 8, 10, 8, 6, 4, 4, 4). Similarly, the remaining gray levels of the pixels (x=11, 12, . . . , 29) equal to (6, 8, . . . , 6), which are shown in FIG. 6.

In FIG. 6, reference character I1 shows the gray level D(x) of each pixel of the horizontal line A2 in the first image data with no shift.

Reference character 12 shows the gray level D(x) and the correct data value D'(x) based on the variable number n=1 of each pixel of the horizontal line A2 in the four-pixel shifted first image data.

Reference character 13 shows the gray level D(x) and the correct data value D'(x) based on the variable number n=2 of each pixel of the horizontal line A2 in the four-pixel shifted first image data.

Reference character 14 shows the gray level D(x) and the correct data value D'(x) based on the variable number n=3 of each pixel of the horizontal line A2 in the four-pixel shifted first image data.

Reference character 15 shows the gray level D(x) and the correct data value D'(x) based on the variable number n=4 of each pixel of the horizontal line A2 in the four-pixel shifted first image data.

Reference character 16 shows the gray level D(x) and the correct data value D'(x) based on the variable number n=5 of each pixel of the horizontal line A2 in the four-pixel shifted first image data.

Reference character 17 shows the gray level D(x) and the correct data value D'(x) based on the variable number n=6 of each pixel of the horizontal line A2 in the four-pixel shifted first image data.

In each of the I2 to I7, the correct data values D'(M+1), . . . , D'(M+n), each of which takes the gray level of "0" corresponding to the minimum gray level virtually exist.

For example, in the I2, that is, the variable number n=1, the correct data value D'(x=10) is obtained based on the equation [1] as follows:

$$D'(x = 10) = (1+1) \times D(x = 10) - \{D'(x = 11)\}$$
$$= 2 \times 4 - 8$$
$$= 0$$

In the 14, that is, the variable number n=3, the correct data value D'(x=15) is obtained based on the equation [1] as follows:

$$D'(x = 15) = (3+1) \times D(x = 15) - \{D'(16) + D'(17) + D'(18)\}$$
$$= 4 \times 4 - (0 - 16 + 16)$$
$$= 16$$

As clearly illustrated in the I2 to I7, the correct data value D'(x) of each pixel of the horizontal line A2 in the four-pixel shifted first image data based on the variable number n=4 (see the 15 in FIG. 6) only coincides with the gray level D(x) of each pixel of the horizontal line A2 in the first image data with no shift. Any correct data value D'(x) unless the variable number n=4 is different from the gray level D(x) of each pixel of the horizontal line A2 in the first image data with no shift.

In other words, even if the first image data is shifted by four pixels, correction of the gray level of each pixel of the first image data based on the equation [1] and the variable number n=4 allows the first image data with no shift to be restored.

Specifically, the correct data value D'(x) of each pixel of the horizontal line A2 in the four-pixel shifted first image data based on the variable number n=4 is clearly distinguished as the minimum gray levels "0" and the maximum gray levels "10". This makes it possible to easily binarize the correct data value D'(x) so as to exceed the decoding quality level.

In contrast, any correct data value D'(x) unless the variable number n=4 is not distinguished as the minimum gray levels "0" and the maximum gray levels "10", which makes it difficult to binarize any correct data value D'(x) unless the variable number n=4 to exceed the decode quality level.

In a like manner with the horizontal pixel line A2, the correct data value D'(x) of each pixel of the vertical line A1 in the first image data can be determined to coincide with the gray level of each pixel of the vertical line A1 in the first image data with no shift.

That is, when the determination in step S9 is YES, the control circuit 16 identifies the current value of the variable number 'n' of pixels with respect to the horizontal pixel line A2 as a horizontal proper value of the correcting variable. As well as the horizontal pixel line A2, the control circuit 16 identifies the current value of the variable number 'n' of pixels with respect to the vertical line A1 as a vertical proper value of the correcting variable.

Then, the control circuit 16 obtains the correct data value D'(x) of each pixel in each vertical scan line of the first image data based on the 8-bit gray level D(x) of each pixel in each vertical scan line thereof, the identified vertical proper value of the variable number 'n' of pixels, and the equation [1]. Similarly, the control circuit 16 obtains the correct data value D'(x) of each pixel in each horizontal scan line of the first image data based on the 8-bit gray level D(x) of each pixel in each horizontal scan line thereof, the identified horizontal proper value of the variable number 'n' of pixels, and the equation [1]. As a result, the correct data value D'(x) of each pixel in the first image data is obtained to be stored in the second memory area 19b of the memory 19 as the second image data.

In step S12, the control circuit 16 binarizes the data value D'(x) of each pixel in the second image data to decode the binarized data, thereby terminating the image stabilizing operations and the readout operations, respectively.

On the other hand, when the incremented variable number 'n' of pixels reaches the upper limit value of K during the repeating operations from step S6 to step S10, the determination in step S6 is YES. Subsequently, the control circuit 16 controls at least one of the beeper 13 and the crystal liquid display 12 to send notice indicative of the failure of the image stabilizing process.

As described above in detail, according to the first embodiment of the present invention, preliminarily correcting the gray level of each pixel within the preliminary correcting region A in the first image data every adjusted value of the correcting variable "n" allows determination of which preliminary correction based on the adjusted values of the correcting variable "n" is proper. This permits identifying one of the adjusted values of the correcting variable "n", which is the most proper in all adjusted variables with respect to the shift of the first image data.

Therefore, it is possible to carry out full-scale correction of the gray level of each pixel in the first image data based on the most proper value of the correcting variable 'n' to generate the second image data, thereby decoding the second image data.

That is, in the first embodiment, it is possible to correct by software the shift of the first image data due to the jiggle by user's hand(s) with holding code reader CR without mechanically moving any optical elements like the publication No. 2003-57707. This makes it possible to reduce the cost of the code reader CR with its structure being simple and compact.

In addition, in the first embodiment, it is possible to correct by software the shift of the first image data due to the jiggle of the user's hand(s) with holding code reader CR without performing the special frequency distribution obtaining process and the autocorrelation function obtaining process like the publication No. 2000-298300. This permits the correction of the shift of the first image data to decrease in complexity and the time required to complete the correction to be short.

Specifically, for example, when measuring the time between picking up image data of a two dimensional code of a target and completing the correction of the shift of the image data by using the image stabilizing method according to the publication No. 2000-298300, the measured result was approximately one second and over.

In contrast, for example, when measuring the time between picking up the first image data and completing the correction of the shift of the first image data by using the code reader CR according to the first embodiment, the measured time was approximately 120 msec (millisecond), which is shorter than the one second.

Especially, in the first embodiment, as the preliminary correcting region A, the vertical and horizontal pixel lines A1 and A2 are established on the predetermined position of the first image data that corresponds to part of the vertical scan line and that of the horizontal scan line each of which passes through the center O of the field of view F.

This arrangement and size of the preliminary correcting area A allows the preliminary correction to be surely applied to part of the first image data corresponding to the two-dimensional code. Specifically, even if the light sensitive pixel area of the photodetector 3 is composed of approximately 330,000 pixels in matrix, it could be confirmed that the arrangement and size of the preliminary correcting area A according to the first embodiment sufficiently allowed determination of the most proper value of the correcting variable 'n' by performing the preliminary corrections based on the preliminary correcting area A.

Moreover, in the first embodiment, when the incremented variable number 'n' of pixels reaches the upper limit value of K during the repeating operations from step S6 to step S10 (see FIG. 5), it is possible to send notice indicative of the failure of the image stabilizing process. Therefore, if the range of the first image data' shift is too large to correct the first image data to be shifted to restore it with no shift, it is possible to send notice indicative the failure of the correction to the user, which can permit the user to pickup the first image data of the two-dimensional code again.

In addition, in the first embodiment, the first image data is shifted by one or more pixels to the other end pixel, and addresses x=1, x=2, . . . , x=M of the horizontal pixel line A2 are ascending sequentially assigned from one end pixel, that is, the leftmost pixel up to the other end pixel, that is, the rightmost pixel, respectively.

The first embodiment, however, can be applied to cases where the addresses x=1, x=2, . . . , x=M of the horizontal pixel line A2 are ascending sequentially assigned from one end pixel, that is, the rightmost pixel up to the other end pixel, that is, the leftmost pixel, respectively, Regardless of the sequential order of the addresses assigned to the pixels of the horizontal pixel line A2, the first embodiment can be applied to the first image data being horizontally shifted by one or more pixels.

Figure 7:
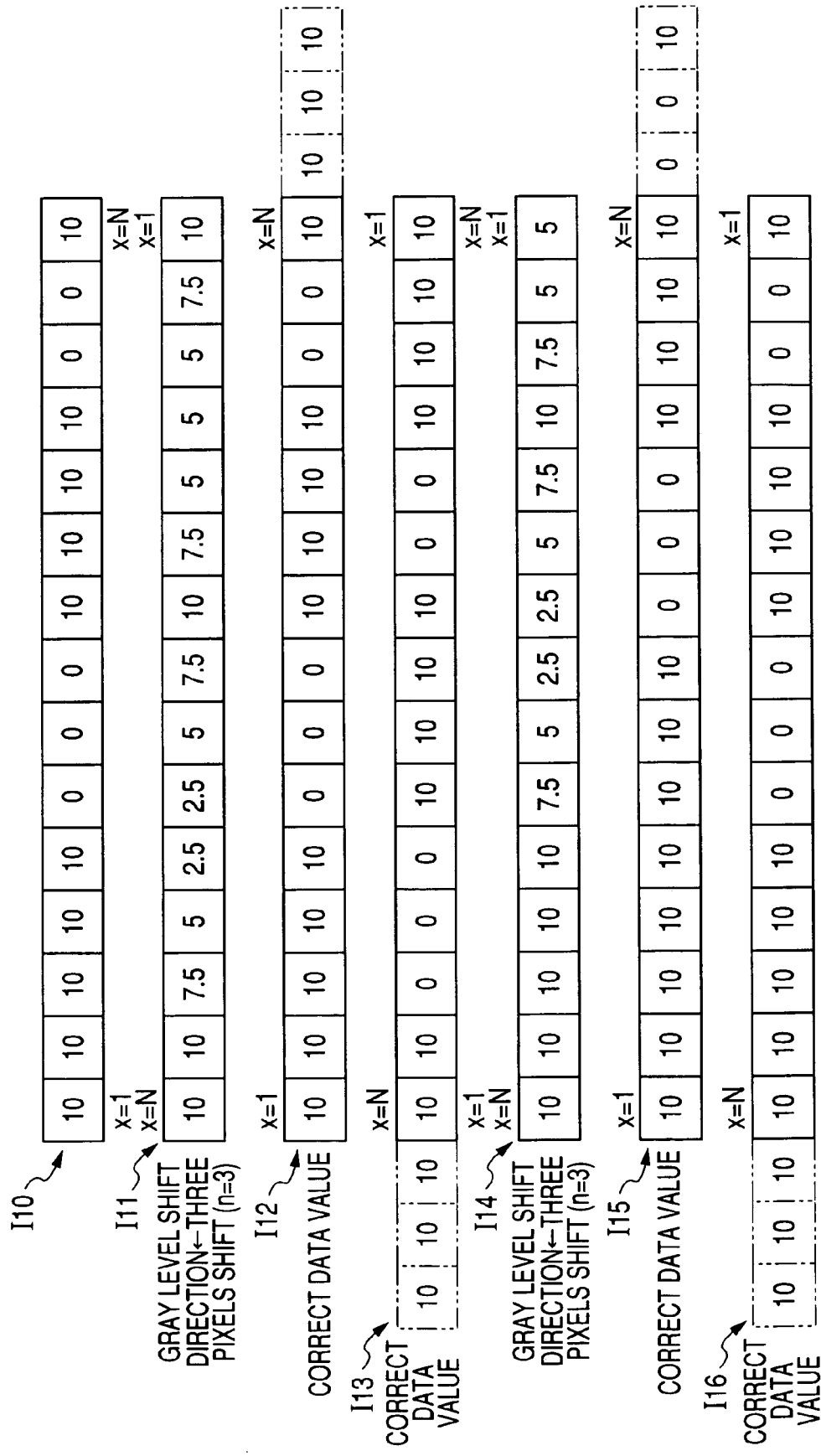
FIG. 7 is a view schematically illustrating correct data values obtained based on the variable number 'n' of pixels of "4" which corresponds to four shifted pixels of the first image data according to the first embodiment.

That is, as shown in FIG. 7, when the horizontal pixel line A2, for example, consists of 15 pixels (M=15), reference character 110 shows the gray level D(x) of each pixel of the horizontal line A2 in the first image data with no shift.

Reference character I11 shows the gray level D(x) of each pixel of the horizontal line A2 in the first image data being shifted by three pixels to the observer's left direction (see FIG. 4).

Reference character I12 shows the correct data value D'(x) of the gray level D(x) assigned to the I11 based on the variable number n=3 when the addresses x=1, x=2, . . . , x=15 of the horizontal pixel line A2 are ascending sequentially assigned from the leftmost pixel up to the rightmost pixel, respectively, Reference character I13 shows the correct data value D'(x) of the gray level D(x) assigned to the I11 based on the variable number n=3 when the addresses x=1 , x=2, . . . , x=15 of the horizontal pixel line A2 are ascending sequentially assigned from the rightmost pixel up to the leftmost pixel, respectively, Reference character I14 shows the gray level D(x) of each pixel of the horizontal line A2 in the first image data being shifted by three pixels to the observer's right direction (see FIG. 4).

Reference character I15 shows the correct data value D'(x) of the gray level D(x) assigned to the I14 based on the variable number n=3 when the addresses x=1, x=2, . . . , x=15 of the horizontal pixel line A2 are ascending sequentially assigned from the leftmost pixel up to the rightmost pixel, respectively, Reference character I13 shows the correct data value D'(x) of the gray level D(x) assigned to the I14 based on the variable number n=3 when the addresses x=1, x=2, . . . , x=15 of the horizontal pixel line A2 are ascending sequentially assigned from the rightmost pixel up to the leftmost pixel, respectively, In each of the I12, I13, I15, and I16, the correct data values D'(M+1), . . . , D'(M+n), each of which takes any one of the gray level of "0" and "10", virtually exist.

As clearly illustrated in FIG. 7, regardless of the shift direction of the first image data and the sequential order of the addresses assigned to the pixels of the horizontal pixel line A2, it is possible to obtain the correct data value D'(x) of each pixel of the horizontal line A2 in the three-pixel shifted first image data based on the variable number n=3 (see I12, I13, I15, and I16). This makes it possible to clearly distinguish the minimum gray levels "0" and the maximum gray levels "10".

Specifically, when the shift direction of the first image data and the ascending sequential direction of the pixel's addresses of the horizontal line A2 are set to be opposite to each other, it is possible to match the addresses of the pixels of the horizontal pixel line in the first image data with no shift and those of the pixels of the horizontal pixel line in the three-pixel shifted first image data (see a pair of I10 and I12, and a pair of I10 and I16).

The relationship between one end pixel and the other end pixel of the horizontal pixel line A2 also applies to the relationship between one end pixel (top or bottom) and the other pixel of the vertical pixel line A1. Therefore, regardless of the shift direction of the first image data and the sequential order of the addresses assigned to the pixels of the vertical pixel line A1, it is possible to obtain the correct data value D'(x) of each pixel of the vertical line A1 in the first image data to be shifted by one or more pixels.

Second Embodiment

Figure 8:
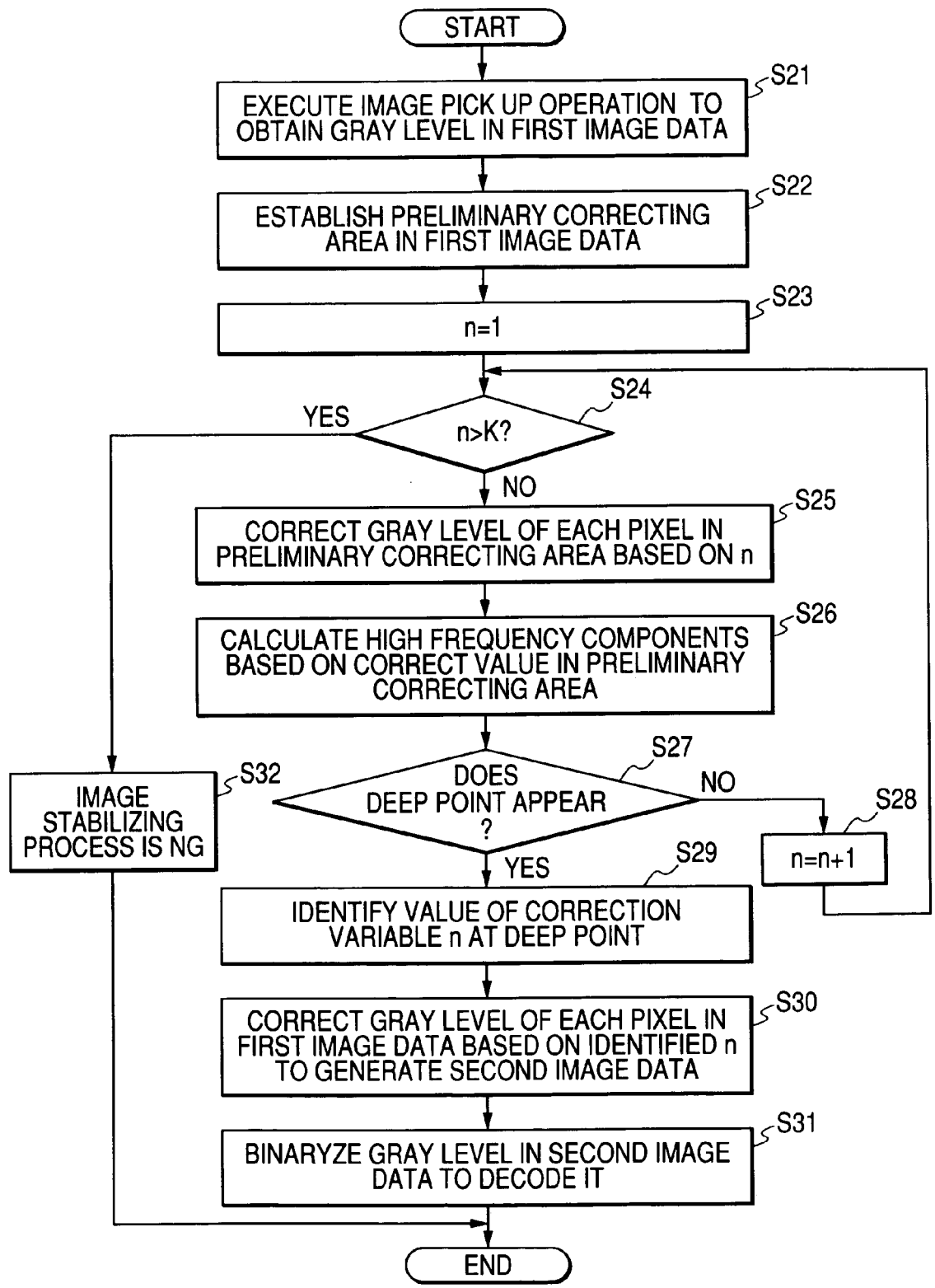
FIG. 8 is a flowchart indicative of operations for reading out a two-dimensional code executed by the control circuit in response to a turn-on operation of a trigger switch according to a second embodiment of the present invention.
Figure 9:
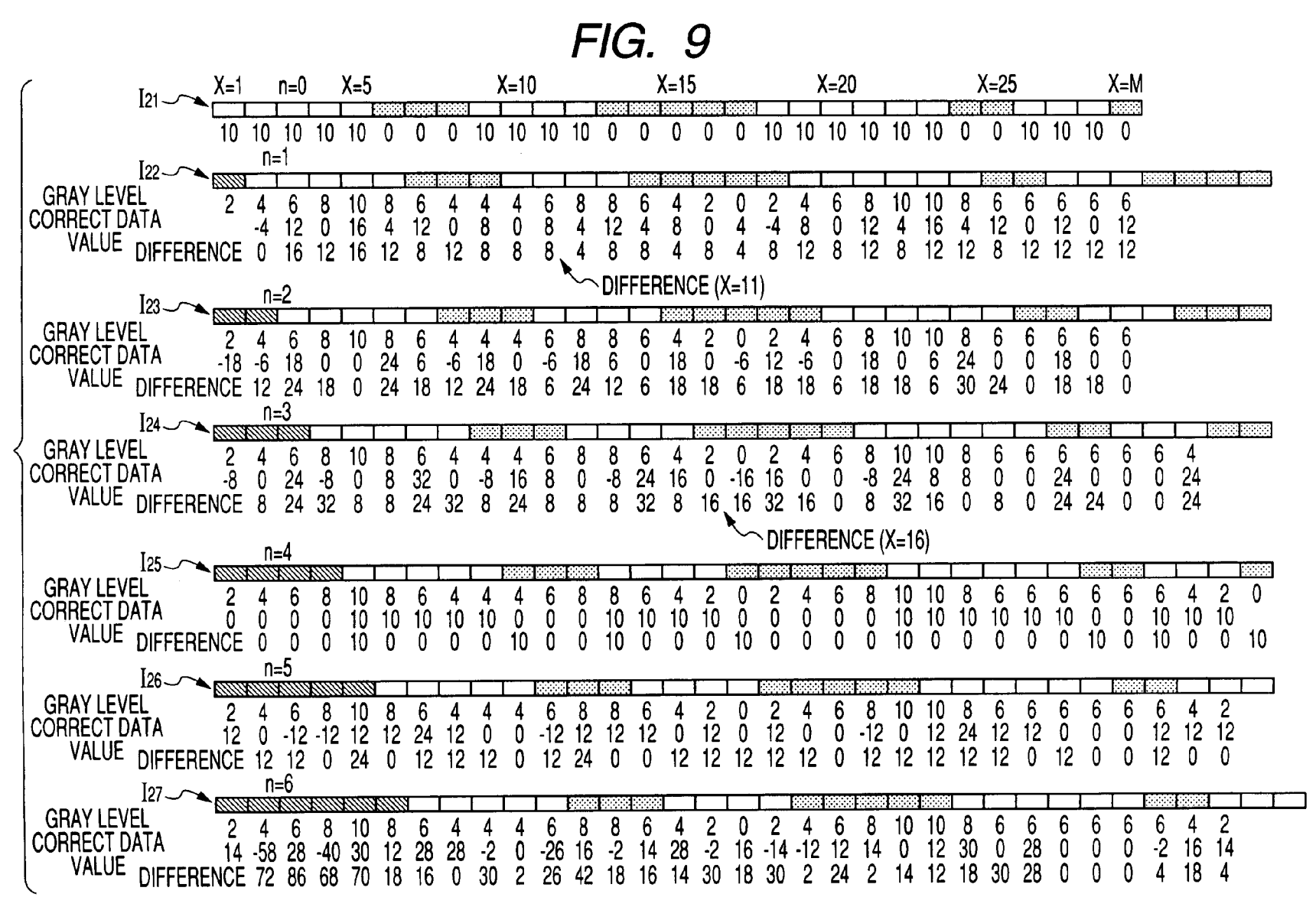
Figure 10:
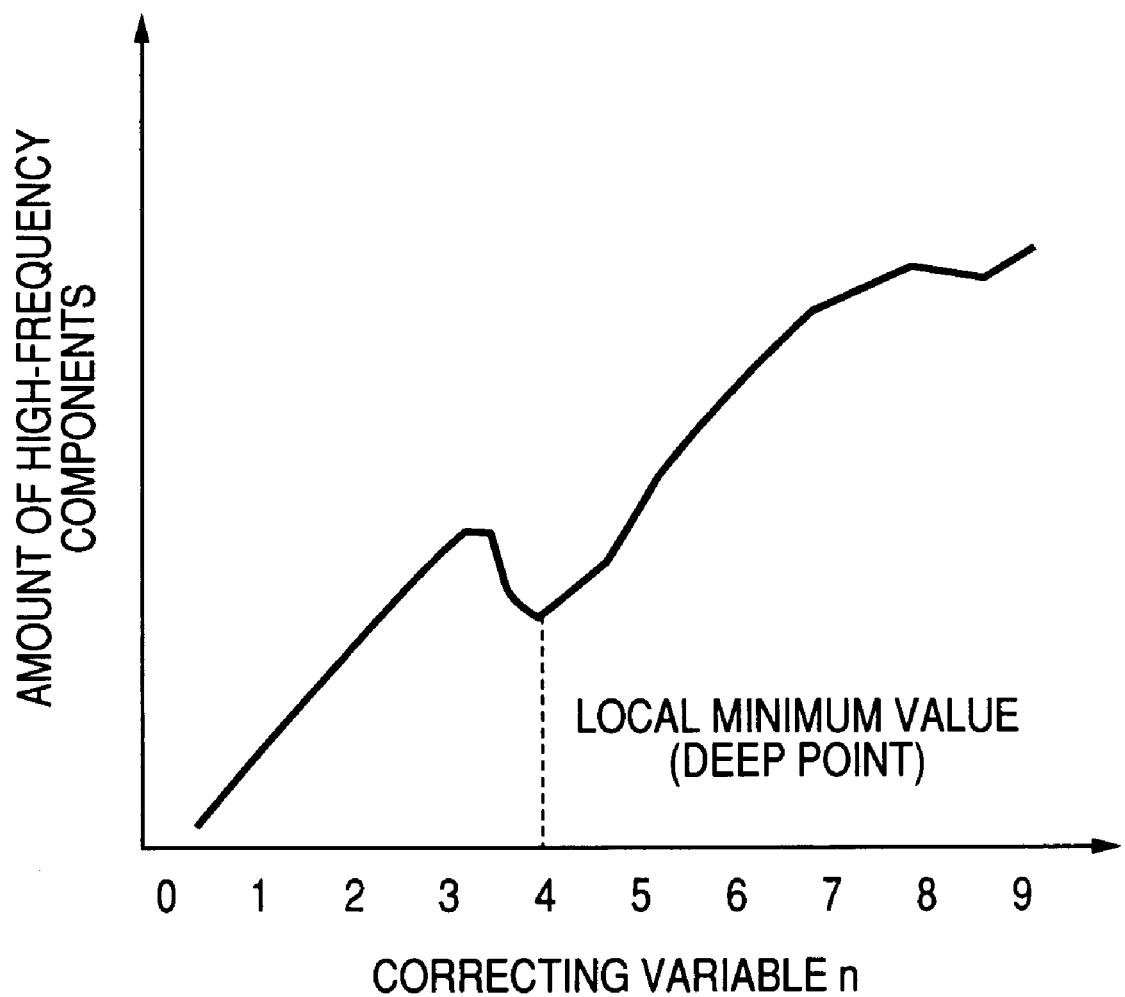
FIG. 10 is a graph on which a function between an amount of high-frequency components and values 1, 2, . . . , 9 of the correction variable n are continuously plotted according to the second embodiment.

FIGS. 8 to 10 illustrate a second embodiment of the present invention. In the second embodiment, descriptions of the hardware elements of the two-dimensional code reader according to the second embodiment, which are substantially identical with those of the code reader CR according to the first embodiment, are omitted or simplified. That is, descriptions are focused on points of the code reader according to the second embodiment, which are different from that according to the first embodiment.

In the second embodiment, an image stabilizing program P1 is different from the image stabilizing program P according to the first embodiment so that image stabilizing operations of the control circuit 16 in accordance with the image stabilizing program P1 are different from those according to the first embodiment.

That is, the control circuit 16 runs the image stabilizing program P1 to perform the preliminary correcting region establishing operation and correcting variable providing operation, which are the same as the first embodiment.

Specifically, in the second embodiment, the control circuit 16 operates, in accordance with the image stabilizing program P1 to:

(g) set the variable number 'n' of pixels to an initial value of "1";

(h) obtain a correct data value of each pixel of each of the vertical and horizontal pixel lines A1 and A2 in the first image data based on the variable number 'n' of pixels;

(i) use the current value of the variable number 'n' of pixels to calculate the amount of high-frequency components based on the obtained correct data values of the pixels of the vertical and horizontal pixel lines A1 and A2 in the first image data;

(b) obtain a function of the amount of high-frequency components with respect to the variable number 'n' of pixels;

(k) determining whether a local minimum value appears as a deep point in the function of the amount of high-frequency components with respect to the variable number 'n' of pixels;

(l) when determining that the local minimum value (deep point) does not appear in the function of the amount of high-frequency components with respect to the current value of the variable number 'n' of pixels, increment the variable number 'n' of pixels by 1; and (m) repeat the operations (h) to (l) unless the local minimum value appears in the function of the amount of high-frequency components with respect to the current value of the variable number 'n' of pixels in the operation of (k).

Specifically, the amount of high-frequency components is represented as the sum of an absolute value of each difference between correct data values of each paired adjacent pixels of each of the vertical and horizontal pixel lines A1 and A2 in the first image data, which can be calculated by the following equation [2]:

$$\sum_{x=2}^{M} |D'(x) - D'(x-1)| \quad [2]$$

FIG. 8 is a flowchart indicative of the operations for reading out the two-dimensional code executed by the control circuit 16 in response to the turn-on operation of the trigger switch 2.

As shown in FIG. 8, when the trigger switch 2 is turned on by the user, in step S21, the control circuit 16 turns each of the light illuminating devices 5 on to expose the photodetector 3 based on a predetermined shutter speed (exposure time) to pick up the image of the two-dimensional code of the target R on which the illuminating light is irradiated.

This results in that light reflected from the two-dimensional code of the target R based on the illuminating light is imaged on the pixel area of the photodetector 3. The image of the two-dimensional code, therefore, is picked up by the photodetector 3.

The picked up image is converted into the pixel data (8-bit gray level) by the amplifier 17 and the A/D converter 18 so that the pixel data (8-bit gray level) corresponding to the two-dimensional code is stored in the first memory area 19a as the first image data.

In step S22 and subsequent steps therefrom, the control circuit 16 performs the image stabilizing process in accordance with the image stabilizing program P1. Incidentally, the control circuit 16 can perform the operations in step S22 and subsequent steps after the operations in steps S2 and S3 like the first embodiment.

In step S22, the control circuit 16 establishes, as the preliminary correcting region A, the vertical pixel line A1 and the horizontal pixel line A2 on part of the first image data stored in the first memory area 19a of the memory 19, which corresponds to the center portion of the field of view F of the photodetector 3. As set forth above, each of the vertical and horizontal pixel lines A1 and A2 consists of dozens of pixels, such as 50 pixels so as to be symmetrical about the predetermined position in the first image data.

Subsequently, the control circuit 16 sets the variable number 'n' of pixels to an initial value, that is, "1" in step S23. Next, the control circuit 16 determines whether the variable number 'n' of pixels exceeds, as a predetermined upper limit value K, the number M of the total pixels of each of the vertical and horizontal pixel lines A1 and A2 in step 324.

When the control circuit 16 determines that the current value of the variable number 'n' of pixels does not exceed the predetermined upper limit value K, the determination in step S24 is NO. The control circuit 16 obtains the correct data value of each pixel of each of the vertical and horizontal pixel lines A1 and A2 in the first image data based on the variable number 'n' of pixels in step S25.

Specifically, in step S25 the control circuit 16 obtains the correct data value D'(x) (x=1, ..., 50) of each pixel of each of the vertical and horizontal pixel lines A1 and A2 in the first image data based on the 8-bit gray level D(x) (x=1, ..., 50) of each pixel of each of the vertical and horizontal pixel lines A1 and A2 in the first image data, the variable number 'n' of pixels and the equation [1]. The operations of the control circuit 16 in step S25 are substantially identical with those thereof in step S7 in FIG. 5.

In step S26, the control circuit 16 calculates, as the amount of high-frequency components, the sum of the absolute value of each difference between correct data values D'(x) of each paired adjacent pixels of each of the vertical and horizontal pixel lines A1 and A2 in the first image data based on the current value of the variable number 'n' of pixels and the equation [2].

Subsequently, the control circuit 16 obtains the function of the sum of the absolute value of each difference between correct data values D'(x) of each paired adjacent pixels with respect to the current value of the variable number 'n' of pixels. Next, the control circuit 16 determines whether the local minimum value (deep point) appears in the function of the amount of high-frequency components with respect to the current value of the variable number 'n' of pixels in step S27.

The local minimum value (deep point) means that the value of the function which is a smallest in a given interval, through which the function rises before falling.

When the control circuit 16 determines that the local minimum value does not appear in the obtained graph of the function of the amount of high-frequency components with respect to the current value of the variable number 'n' of pixels, the determination in step S27 is NO. Then, the control circuit 16 increments the variable number 'n' of pixels by 1 in step S28, shifting to step S24.

That is, the control circuit 16 repeats the operations from step S24 to step S28 based on the incremented variable number 'n' of pixels unless it is determined that the current value of the variable number 'n' of pixels exceeds the predetermined upper limit value K in step S24, or the local minimum value appears in the obtained graph of the function of the amount of high-frequency components with respect to the variable number 'n' of pixels in step S27.

FIG. 9 is a view schematically illustrating the correct data values D'(x) obtained each time the variable number 'n' of pixels from "1" to "6" is changed assuming that the first image data is shifted by four pixels to the other end pixel (observer's right). FIG. 9 is similar to FIG. 6 so that descriptions of the elements in FIG. 9, which are identical with those in FIG. 6, are omitted or simplified.

In FIG. 9, reference character I21 shows the gray level D(x) of each pixel of the horizontal line A2 in the first image data with no shift.

Reference character I22 shows, in addition to the gray level D(x) and the correct data value D'(x) based on the variable number n=1, the difference {D'(x)−D'(x−1)} every address (x=2, ..., M=29).

Reference character I23 shows, in addition to the gray level D(x) and the correct data value D'(x) based on the variable number n=2, the difference {D'(x)−D'(x−1)} every address (x=2, ..., M=29).

Reference character I24 shows, in addition to the gray level D(x) and the correct data value D'(x) based on the variable number n=3, the difference {D'(x)−D'(x−1)} every address (x=2, ..., M=29).

Reference character I25 shows, in addition to the gray level D(x) and the correct data value D'(x) based on the variable number n=4, the difference {D'(x)−D'(x−1)} every address (x=2, ..., M=29).

Reference character I26 shows, in addition to the gray level D(x) and the correct data value D'(x) based on the variable number n=5, the difference {D'(x)−D'(x−1)} every address (x=2, ..., M=29), Reference character I27 shows, in addition to the gray level D(x) and the correct data value D'(x) based on the variable number n=6, the difference {D'(x)−D'(x−1)} every address (x=2, ..., M=29).

For example, in the I22, that is, the variable number n=1, because the correct data value D'(x=10)=0 and the correct data value D'(x−11)=8, the difference {D'(x)−D'(x−1)} (x=11) is calculated based on the equation [2] as follows:

$$\text{The absolute value of difference}(x = 11) =$$
$$D'(11) - D'(11-1) = 8 - 0 = 8$$

In the I24, that is, the variable number n=3, because the correct data value D'(x=15)=16 and the correct data value D'(x=16)=0, the difference {D'(x)−D'(x−1)} (x=16) is calculated based on the equation [2] as follows:

$$\text{The absolute value of difference}(x = 16) =$$
$$D'(16) - D'(15) = 0 - 16 = 16$$

That is, the sum of the differences {D'(x)−D'(x−1)} (x 2, . . . , M=29) represents the amount of high-frequency components.

FIG. 10 is a graph on which the function between the amount of high-frequency components and the values 1, 2, . . . , 9 of the correction variable n are continuously plotted. The vertical axis represents the amount of high-frequency components every value of the correction variable n and the horizontal axis represents the values 1, 2, . . . , 9 of the correction variable n.

As clearly understood in FIG. 10, the local minimum value (deep point) of the function appears where the value of the correcting variable n is "4".

In a like manner with the horizontal pixel line A2, the value of the correcting variable n related to the correct data value D'(x) of each pixel of the vertical line A1 in the first image data can be determined. Then, in step S27, when the control circuit 16 determines the local minimum value (deep point) appears in the function of the amount of high-frequency components with respect to the current value of, for example, "5" of the variable number 'n' of pixels, the determination in step S27 is YES.

Then, the control circuit 16 identifies the previous value (=4) of the variable number 'n' of pixels with respect to the vertical line A2, which corresponds to the local minimum point (deep point) of the function, as a horizontal proper value of the correcting variable. Similarly, the control circuit 16 identifies the previous value of the variable number 'n' of pixels with respect to the vertical line A1 as a vertical proper value of the correcting variable in step S29.

Subsequently, the control circuit 16 obtains the correct data value D'(x) of each pixel in each vertical line of the first image data based on the 8-bit gray level D(x) of each pixel in each vertical line thereof, the identified vertical proper value of the variable number 'n' of pixels, and the equation [1]. Similarly, the control circuit 16 obtains the correct data value D'(x) of each pixel in each horizontal line of the first image data based on the 8-bit gray level D(x) of each pixel in each horizontal line thereof, the identified horizontal proper value of the variable number 'n' of pixels, and the equation [1]. As a result, the correct data value D'(x) of each pixel in the first image data is obtained to be stored in the second memory area 19b of the memory 19 as the second image data in step S30.

In step S31, the control circuit 16 binarizes the data value D'(x) of each pixel in the second image data to decode the binarized data, thereby terminating the image stabilizing operations and the readout operations, respectively.

On the other hand, when the incremented variable number 'n' of pixels reaches the upper limit value of K during the repeating operations from step S24 to step S27, the determination in step S24 is YES. Subsequently, the control circuit 16 controls at least one of the beeper 13 and the crystal liquid display 12 to send notice indicative of the failure of the image stabilizing process in step S32.

As described above, according to the second embodiment of the present invention, preliminarily correcting the gray level of each pixel within the preliminary correcting region A in the first image data every adjusted value of the correcting variable "n" allows determination of which preliminary correction based on the adjusted values of the correcting variable "n" is proper. This permits identifying one of the adjusted values of the correcting variable "n", which is the most proper in all adjusted variables with respect to the shift of the first image data.

Therefore, it is possible to carry out full-scale correction of the gray level of each pixel in the first image data based on the most proper value of the correcting variable 'n' to generate the second image data, thereby decoding the second image data.

That is, in the first embodiment, it is possible to correct by software the shift of the first image data due to the jiggle of the user's hand(s) with holding code reader CR. This makes it possible to reduce the cost of the code reader CR with its structure being simple and compact. In addition, in the second embodiment, it is possible to easily determine which preliminary correction based on the adjusted values of the correcting variable "n" is proper based on the amount of high-frequency components in the obtained correct data values of the pixels of the vertical and horizontal pixel lines A1 and A2 in the first image data.

Incidentally, in the second embodiment, as the amount of the high-frequency components, the control circuit 16 calculates the sum of the absolute value of each difference between correct data values D'(x) of each paired adjacent pixels of each of the vertical and horizontal pixel lines A1 and A2 in the first image data. The present invention, however, is not limited to the calculation. That is, the control circuit 16, as means for calculating the amount of the high-frequency components, can subject the correct data values of the pixels of each of the vertical and horizontal pixel lines A1 and A2 in the first image data to secondary differentiation to obtain the amount of high-frequency components (rapidly changing components) in the correct data values of the pixels of each of the vertical and horizontal pixel lines A1 and A2 in the first image data.

Third Embodiment

Figure 11A:
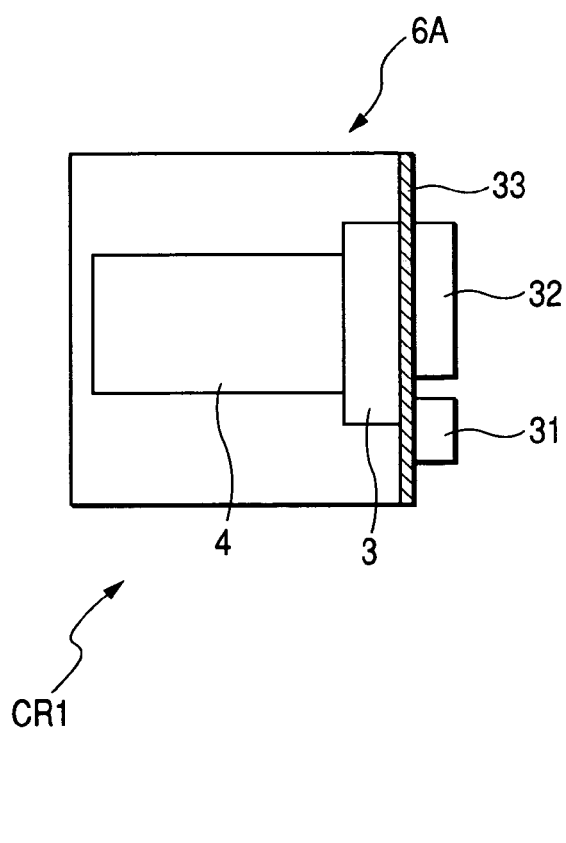
FIG. 11A is a partially cross sectional side view schematically illustrating a structure of a reading mechanism shown in FIGS. 1 and 2 according to a third embodiment of the present invention.
Figure 11B:
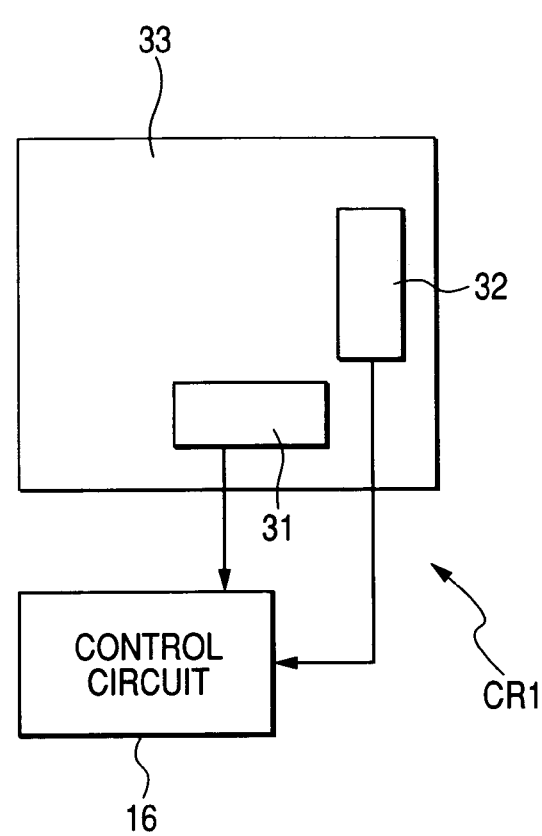
FIG. 11B is a view schematically illustrating a back surface of a substrate of the reading mechanism according to the third embodiment.
Figure 12:
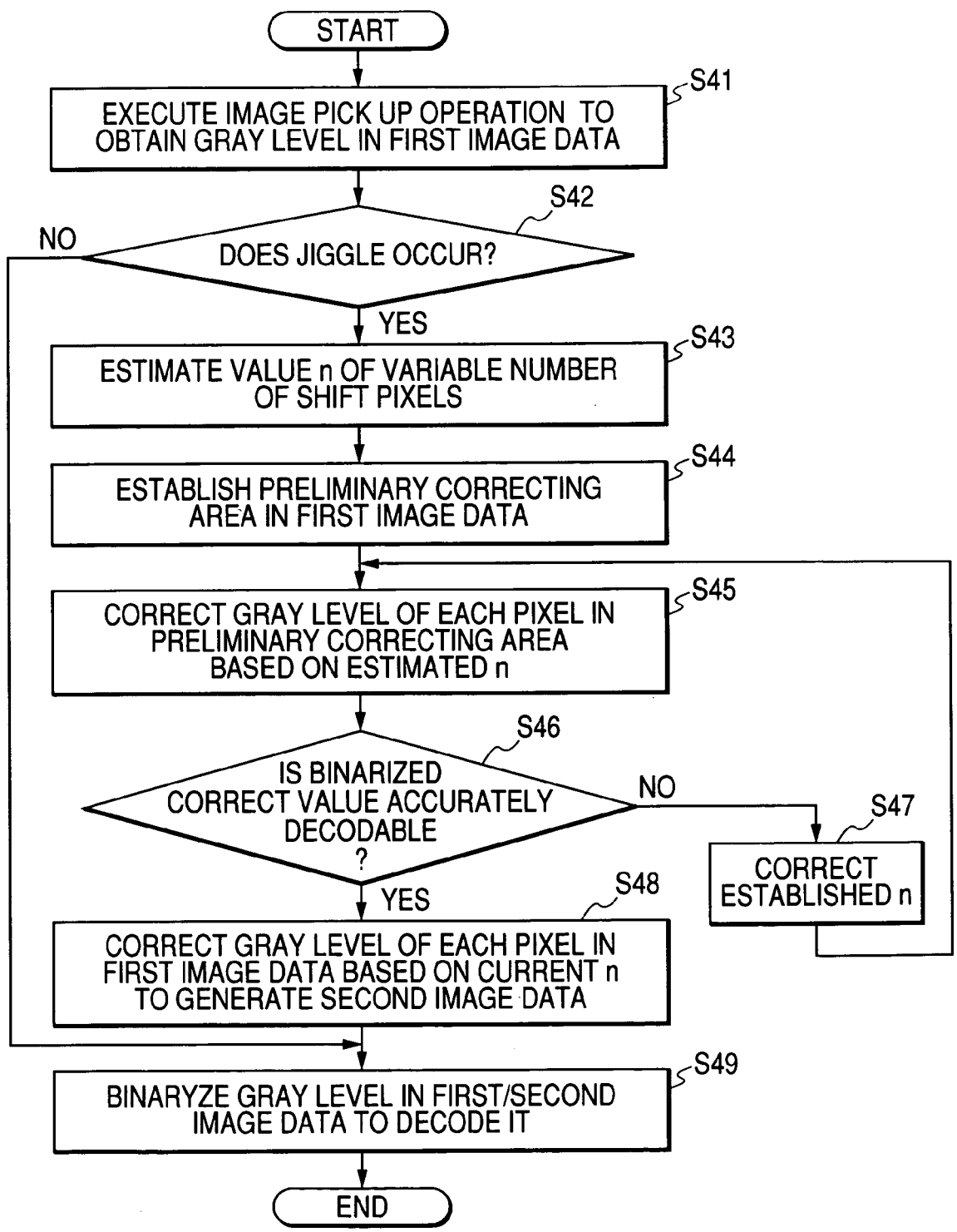
FIG. 12 is a flowchart indicative of operations for reading out a two-dimensional code executed by the control circuit in response to a turn-on operation of a trigger switch according to a third embodiment of the present invention.

FIGS. 11A to 12 illustrate a third embodiment of the present invention. In the third embodiment, a two-dimensional code reader CR1 according to the third embodiment is provided with first and second jiggle detectors 31 and 32. The first and second jiggle detectors 31 and 32 are operative detect a first jiggle distance of the code reader CR1 along a vertical direction parallel to the vertical scan line of the photodetector 3 and a second jiggle distance of the code reader CR1 along a horizontal direction parallel to the horizontal scan direction of the photodetector 3, respectively.

In the third embodiment, the reading mechanism 6A is provided with a substrate 33 arranged to be opposite to the reading window 1c of the housing 1 (see FIG. 1). The photodetector 3 and the imaging lens 4 of the reading mechanism 6A are mounted on one surface of the substrate, which is opposite to the reading window 1c of the housing 1, respectively. The first and second jiggle detectors 31 and 32 are mounted on the other surface (back surface) of the substrate 33, respectively.

The first jiggle detector 31 is designed to detect a distance of a vertical jiggle of the code reader CR along the vertical direction, which substantially appears at the photodetector 3, and the second jiggle detector 32 is designed to detect a distance of a horizontal jiggle of the code reader CR along the horizontal direction orthogonal to the vertical direction, which substantially appears at the photodetector 3.

That is, the first and second jiggle detectors 31 and 32 are capable of detecting a distance of a jiggle of the code reader CR in two-dimensional directions orthogonal to the optical axis of the reading mechanism 6.

As the first jiggle detector 31, a gyro-sensor can be used to detect the angular rate of the vertical jiggle of the code reader CR1 along the vertical direction to obtain the distance of the vertical jiggle of the code reader CR1 along the vertical direction based on the detected angular rate. Similarly, as the second jiggle detector 32, a gyro-sensor can be used to detect the angular rate of the horizontal jiggle of the code reader CR1 along the horizontal direction to obtain the distance of the horizontal jiggle of the code reader CR1 along the horizontal direction based on the detected angular rate.

In the third embodiment, an image stabilizing program P2 is different from the image stabilizing programs P and P1 according to the first and second embodiments so that image stabilizing operations of the control circuit 16 in accordance with the image stabilizing program P2 is different from those according to the first embodiment.

That is, the control circuit 16 runs the image stabilizing program P2 to:

determine whether the movement (jiggle) of the code reader CR along at least one of the vertical and horizontal directions exceeds a predetermined shift distance based on jiggle detection signals indicative of the vertical and horizontal jiggle distances periodically sent from the first and second jiggle detectors 31 and 32, respectively;

when determining that the movement (jiggle) of the code reader CR along at least one of the vertical and horizontal directions exceeds the predetermined shift distance, establish the preliminary correcting region on part of the first image data stored in the first memory area 19*a* of the memory 19;

provide the correcting variable to correct the movement of the first image data;

while adjusting the value of the correcting variable, preliminarily correct the gray level of each pixel within the preliminary correcting region in the first image data every adjusted value of the correcting variable;

determine which preliminary corrections corresponding to the adjusted values of the correcting variable is proper based on the corrected results; and when one of the preliminary corrections is proper, correct the gray level of each pixel in the first image data based on one of the adjusted values of the correcting variable, which corresponds to the one of the preliminary corrections.

That is, in the third embodiment, the control circuit 16 preferably serves as an estimating unit.

FIG. 12 is a flowchart indicative of the operations for reading out the two-dimensional code executed by the control circuit 16 in response to the turn-on operation of the trigger switch 2.

As shown in FIG. 12, when the trigger switch 2 is turned on by the user, in step S41, the control circuit 16 turns each of the light illuminating devices 5 on to expose the photodetector 3 based on a predetermined shutter speed (exposure time) to pick up the image of the two-dimensional code of the target R on which the illuminating light is irradiated.

This results in that light reflected from the two-dimensional code of the target R based on the illuminating light is imaged on the pixel area of the photodetector 3. The image of the two-dimensional code, therefore, is picked up by the photodetector 3.

The picked up image is converted into the pixel data (8-bit gray level) by the amplifier 17 and the A/D converter 18 so that the pixel data (8-bit gray level) corresponding to the two-dimensional code is stored in the first memory area 19*a* as the first image data.

In step S42, the control circuit 16 determines whether the movement (jiggle) of the code reader CR along at least one of the vertical and horizontal directions exceeds the predetermined shift distance based on the jiggle detection signals sent from the first and second jiggle detectors 31 and 32, respectively, when the first image data is being picked up by the photodetector 3.

When determining that the movement of the code reader CR along each of the vertical and horizontal directions exceeds the predetermined shift distance, the determination in step S42 is YES, the control circuit 16 estimates, based on the jiggle detection signals, a value of variable number 'n' of a shift amount of the first image data along the vertical direction and that thereof along the horizontal direction in step S43.

When determining that the movement of the code reader CR along each of the vertical and horizontal directions does not exceed the predetermined shift distance, the determination in step S42 is NO, the control circuit 16 shifts to step S48.

Subsequently, the control circuit 16 establishes, as the preliminary correcting region A, the vertical pixel line A1 and the horizontal pixel line A2 on part of the first image data stored in the first memory area 19*a* of the memory 19, which corresponds to the center portion of the field of view F of the photodetector 3. As set forth above, each of the vertical and horizontal pixel lines A1 and A2 consists of dozens of pixels, such as 50 pixels so as to be symmetrical about the predetermined position in the first image data in Step S44.

In steps S43 and S44, if determining that the movement of the code reader CR along one of the vertical and horizontal directions exceeds the predetermined shift distance, the control circuit 16 can estimate, based on the jiggle detection signals, the number of shift pixels of the first image data along one of the vertical and horizontal directions.

In addition, when determining that the movement of the code reader CR along one of the vertical and horizontal directions exceeds the predetermined shift distance, the determination in step S42 is YES. The control circuit 16 can estimate, based on the jiggle detection signals, the estimated value of variable number 'n' of shift pixels of the first image data along one of the vertical and horizontal directions.

In this modification, the control circuit 16 can establish, as the preliminary correcting region A, one of the vertical pixel line A1 and the horizontal pixel line A2 on part of the first image data stored in the first memory area 19*a* of the memory 19, which corresponds to the estimated value of the variable number 'n' of shift pixels and estimated shift direction. In this modification, the correcting operations hereinafter can be performed based on one of the vertical pixel line A1 or the horizontal pixel line A2.

In step S45, the control circuit 16 obtains the correct data value D'(x) of each pixel in each vertical scan line of the first image data based on the 8-bit gray level D(x) of each pixel in each vertical scan line thereof, the estimated value of the variable number 'n' of shift pixels, and the equation [1]. Similarly, the control circuit 16 obtains the correct data value D'(x) of each pixel in each horizontal scan line of the first image data based on the 8-bit gray level D(x) of each pixel in each horizontal scan line thereof, the estimated value of the variable number 'n' of shift pixels, and the equation [1].

In step S46, the control circuit 16 binarizes the correct data value D'(x) of each pixel each of the vertical and horizontal pixel lines A1 and A2 in the first image data and determines whether the binarized correct data value D'(x) of each pixel in the first image data is accurately decodable based on the decoding quality level.

When the control circuit 16 determines that the binarized correct data value D'(x) of each pixel in the first image data is not accurately decodable, the determination in step S46 is NO. Then, the control circuit 16 corrects the estimated value of the variable number 'n' of shift pixels to estimate a value of the variable number 'n', which is close to the estimated value.

The control circuit 16 repeats the operations from step S45 to step S47 based on the estimated value of the variable number 'n' of shift pixels unless it is determined that the binarized correct data value D'(x) of each pixel of each of the vertical and horizontal pixel lines A1 and A2 in the first image data is accurately decodable based on the decoding quality level in step S46.

When the control circuit 16 determines that the binarized correct data value D'(x) of each pixel in the first image data is accurately decodable, the determination in step S46 is YES. Then, the control circuit 16 identifies the current estimated value of the variable number 'n' of shift pixels with respect to the horizontal pixel line A2 as a horizontal proper value of the correcting variable. As well as the horizontal pixel line A2, the control circuit 16 identifies the current estimated value of the variable number 'n' of shift pixels with respect to the vertical line A1 as a vertical proper value of the correcting variable.

As well as the first embodiment, the control circuit 16 corrects the 8-bit gray level D(x) of each pixel in each of the vertical and horizontal scan lines in the first image data based on the identified vertical and horizontal proper values of the variable number 'n' of shift pixels to obtain the data value D'(x) of each pixel in the first image data in step S48.

In step S49, the control circuit 16 binarizes the data value D'(x) of each pixel in the first image data to decode the binarized data, thereby terminating the image stabilizing operations and the readout operations, respectively.

As described above, according to the third embodiment of the present invention, it is possible to correct by software the shift of the first image data due to the jiggle of the user's hand(s) with holding code reader CR. This makes it possible to reduce the cost of the code reader CR and the time required for reading out the two-dimensional code with its structure being simple and compact. In addition, in the third embodiment, the first and second jiggling detectors 31 and 32 allow the image stabilizing process to be performed if need arises.

Moreover, the first and second jiggling detectors 31 and 32 permit the control circuit 16 to estimate the value of the variable number 'n' of shift pixels based on the jiggle detection signals indicative of the vertical and horizontal jiggle distances of the code reader CR sent from the first and second jiggle detectors 31 and 32.

This makes it possible to correct the first image data by using the value of the variable number 'n' of shift pixels, which is close to the actual shift amount of the code reader CR, thereby improving the efficiency of obtaining the proper value of the correcting variable 'n'.

Incidentally, the present invention is not limited to each of the first to third embodiments so that various expansions and modifications can be made within the scope of the present invention.

That is, in each of the first to third embodiments, the apparatus according to the present invention is applied to optical readout of the two-dimensional code, such as QR code, but the present invention is not limited to the application. The present invention can be applied to optical readout of another type of two-dimensional codes and/or one-dimensional codes, such as barcodes. When reading out a one-dimensional code, such as a barcode, written on a target, as the preliminary correcting region, the horizontal pixel line can be set on the one-dimensional to be parallel to each other. In place of the area sensor composed of a plurality of pixels arranged vertically and horizontally in matrix as the photodetector 3, line sensor composed of a plurality of pixels arranged in one dimension can be adopted.

In the first embodiment, the control circuit 16 binarizes the obtained correct data value D'(x) of each pixel of each of the vertical and horizontal pixel lines A1 and A2 in the first image data based on the current value of the variable number 'n' to determine whether the current value of the variable number 'n' is proper. The present invention, however, is not limited to the structure.

That is, the control circuit 16 can calculate, in step S9, a ratio of pixels each having the maximum gray level or the minimum gray level to the total pixels in the vertical and horizontal pixel lines A1 and A2 every value of the correct variable 'n' as an estimated value.

In addition, in step S9, the control circuit 16 can store the estimated values and the corresponding values of the correcting variable 'n' in the memory 19 to be associated with each other. Moreover, during the repeat operations from step S6 to step S10, when storing the currently calculated estimated value and the corresponding current value of the correct variable 'n', if the previous estimated value stored in the memory 19 is smaller than the currently calculated estimated value, the control circuit may overwrite the currently calculated estimated value on the previous estimated value in the memory 19.

In this modification, when the control circuit 16 determines that the current value of the correct variable 'n' exceeds the predetermined upper limit value K, in step S13, the control circuit 16 may select one of the estimated values stored in the memory 19, which is the highest in them. The control circuit, therefore, may correct the first image data based on the value of the correct variable 'n' corresponding to the selected estimated value.

In each of the first to third embodiments, the preliminary correcting area A is composed of the vertical pixel line A1 and the horizontal pixel line A2. Each of the vertical and horizontal pixel lines Al and A2 consists of dozens of pixels, such as 50 pixels, to be symmetrical about the predetermined position in the first image data, which corresponds to the center O of the field of view F, that is, the intersection point between the lines A1 and A2.

In the present invention, however, the configuration of the preliminary correcting area A is not limited to the structure. That is, the configuration of the preliminary correcting area A may be changed to allow detection of a shift of the first image data in any two dimensional directions orthogonal to the optical axis of the photodetector 3 at least due to the jiggle of the code reader.

In each of the first to third embodiments, a shift of the first image data may occur due to some other factors in addition to or except for the jiggle of the code reader.

In each of the first to third embodiments, the present invention is applied to a gun-shaped two-dimensional code reader, but the present invention is not limited to the structure of each of the first to fifth embodiments. That is, an optical information reader according to the present invention may have a handheld structure. In addition, as the jiggling detectors, acceleration sensors can be used. Notice means for sending a notice to a user is not limited to the structure shown in each of the first to third embodiments, and various types of notice units can be applied.

Moreover, those skilled in the art will appreciate that the present invention is capable of being distributed as a program product, for example, the image stabilizing program P, in a variety of forms. It is also important to note that the present invention applies equally regardless of the particular type of signal bearing media used to actually carry out the distribution. Examples of suitable signal bearing media include recordable type media such as floppy disks and CD-ROM, and transmission type media such as digital and analog communications links.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus having a photodetector with a plurality of pixels arranged in at least one dimension and designed to optically pick up an image of an information code by the pixels of the photodetector, the apparatus comprising:
    an establishing unit configured to establish a preliminary correcting region on part of image data based on the picked-up image;
    a preliminary correcting unit configured to;
    provide a correcting variable that represents a shift amount of the image data; and
    preliminarily correct the part of the image data within the preliminary correcting region based on a value of the correcting variable;
    a determining unit configured to determine whether the preliminary correction of the preliminary correcting unit is proper based on the corrected result; and
    a correcting unit configured to, when the determining unit determines that the preliminary correction of the preliminary correcting unit is proper, correct the image data based on the value of the correcting variable,
    wherein the image data is composed of gray levels of the pixels of the photodetector, the value of the correcting variable represents a number n of pixels corresponding to the shift amount of the image data, and the preliminary correcting unit is configured to preliminarily correct the gray level of each pixel of the photodetector within the preliminary correcting region based on the value of the correcting variable.

2. An apparatus according to claim 1, wherein the preliminary correcting region has at least one pixel line that is parallel to the at least one dimension and that consists of M pixels, the gray level of each pixel of the at least one pixel line is represented as $D(x)$, and the x represents an address of each pixel of the at least one pixel line, and each of the preliminary correcting unit and the correcting unit is configured to obtain a correct data value $D'(x)$ of each pixel of the at least one pixel line based on the following equation:

$$D'(x) = (n+1)D(x) - \sum_{a=x+1}^{x+M} D'(a)$$

$$\text{where } \sum_{a=M+1}^{M+n} D'(a) = \text{constant}$$

3. An apparatus according to claim 1, wherein a changeable range of the number n of pixels is previously determined, and the preliminary correcting unit is configured to:
    preliminarily correct the gray level of each pixel of the photodetector within the preliminary correcting region based on which the number n of pixels is set to 1; and
    repeatedly correct the gray level of each pixel of the photodetector within the preliminary correcting region while the number n of pixels is incremented by 1 unless the incremented number n of the pixels exceeds the changeable range and the determining unit determines that at least one of the preliminary corrections is proper.

4. An apparatus according to claim 3, wherein the determining unit is configured to:
    calculate an amount of high-frequency components of the corrected gray levels of the pixels of the photodetector within the preliminary correcting region every value of the number n of pixels;
    obtain a function of each amount of the high-frequency components and each value of the number n of pixels;
    determine whether a local minimum value appears in any one of the functions of the amounts of high-frequency components with respect to the values of the variable number n of pixels; and
    determine that one of the values of the variable number n of pixels is the shift amount of the image data when the local minimum value appears in one of the functions of one of the amounts of high-frequency components with respect to the one of the values of the variable number n of pixels.

5. An apparatus according to claim 4, wherein the preliminary correcting region has at least one pixel line parallel to the at least one dimension and consisting of M pixels, the gray level of each pixel of the at least one pixel line is represented as $D(x)$, and the x represents an address of each pixel of the at least one pixel line, a correct data value $D'(x)$ of each pixel of the at least one pixel line based on the following equation:

$$D'(x) = (n+1)D(x) - \sum_{a=x+1}^{x+M} D'(a)$$

$$\text{where } \sum_{a=M+1}^{M+n} D'(a) = \text{constant}$$

and wherein the determining unit is configured to calculate the amount of high-frequency components of the corrected gray levels of the pixels of the photodetector within the preliminary correcting region every value of the number n of pixels based on the following equation:

$$\sum_{x=2}^{M} |D'(x) - D'(x-1)|$$

6. An apparatus according to claim 4, wherein the determining unit is configured to subject the corrected gray levels of the pixels of the photodetector within the preliminary correcting region to secondary differentiation to calculate the amount of high-frequency components in the correct data values of the pixels of the photodetector within the preliminary correcting region every value of the number n of pixels.

7. An apparatus according to claim 1, further comprising a binarizing unit configured to binarize the image data based on the picked-up image to determine whether the binarized image data is accurately decodable based on a decoding quality level, and wherein the establishing unit is configured to start to establish the preliminary correcting region on part of the image data when the binarizing unit determines that the binarized image data is not accurately decodable based on the decoding level.

8. An apparatus having a photodetector with a plurality of pixels arranged in at least one dimension and designed to optically pick up an image of an information code by the pixels of the photodetector, the apparatus comprising:
an establishing unit configured to establish a preliminary correcting region on part of image data based on the picked-up image;
a preliminary correcting unit configured to:
provide a correcting variable that represents a shift amount of the image data; and
preliminarily correct the part of the image data within the preliminary correcting region based on a value of the correcting variable;
a determining unit configured to determine whether the preliminary correction of the preliminary correcting unit is proper based on the corrected result; and
a correcting unit configured to, when the determining unit determines that the preliminary correction of the preliminary correcting unit is proper, correct the image data based on the value of the correcting variable,
wherein the preliminary correcting region is established on the part of the image data so as to correspond to a center portion of a field of view of the photodetector, the pixels of the photodetector are arranged in a matrix, the preliminary correcting region is composed of a vertical pixel line parallel to a vertical scan line of the photodetector and a horizontal pixel line parallel to a horizontal scan line thereof, and each of the vertical pixel line and the horizontal pixel line comprises dozens of pixels.

9. An apparatus according to claim 8, further comprising a binarizing unit configured to binarize the image data based on the picked-up image to determine whether the binarized image data is accurately decodable based on a decoding quality level, and wherein the establishing unit is configured to start to establish the preliminary correcting region on part of the image data when the binarizing unit determines that the binarized image data is not accurately decodable based on the decoding quality level.

10. An apparatus having a photodetector with a plurality of pixels arranged in at least one dimension and designed to optically pick up an image of an information code by the pixels of the photodetector, the apparatus comprising:
an establishing unit configured to establish a preliminary correcting region on part of image data based on the picked-up image;
a preliminary correcting unit configured to:
provide a correcting variable that represents a shift amount of the image data; and
preliminarily correct the part of the image data within the preliminary correcting region based on a value of the correcting variable;
a determining unit configured to determine whether the preliminary correction of the preliminary correcting unit is proper based on the corrected result; and
a correcting unit configured to, when the determining unit determines that the preliminary correction of the preliminary correcting unit is proper, correct the image data based on the value of the correcting variable,
wherein the preliminary correcting unit is configured to:
preliminarily correct the part of the image data within the preliminary correcting region based on the value of the correcting variable and;
when the determining unit determines the preliminary correction corresponding to the value of the correcting variable is not proper based on the corrected result, repeatedly change the value of the correcting variable to preliminarily correct the part of the image data within the preliminary correcting region based on every changed value of the correcting variable until the determining unit determines that the preliminary correction corresponding to any one of the changed values of the correcting variable is proper, and
wherein the determining unit is configured to:
calculate a ratio of pixels each having one of a maximum gray level and a minimum gray level to total pixels in the preliminary correcting region every changed value of the correcting variable as an estimated value; and
store each of the estimated values and each of the changed values of the correcting variable in a memory to be associated with each other.

11. An apparatus according to claim 10, wherein, while the preliminary correcting unit is configured to repeatedly change the value of the correcting variable to preliminarily correct the part of the image data within the preliminary correcting region every changed value of the correcting variable, the determining unit is configured to overwrite a currently estimated value on a previously estimated value stored in the memory if the previously estimated value is smaller than the currently estimated value.

12. An apparatus according to claim 10, wherein a changeable range of the correcting variable is previously determined, further comprising an excess determining unit configured to determine whether a currently changed value of the correcting variable exceeds the variable range while the determining unit does not determine that any one the preliminary corrections corresponding to all of the changed values within the changeable range is proper, and
wherein the correcting unit is configured to correct the image data based on one of the changed values of the correcting variable when the excess determining unit determines that the currently changed value of the correcting variable exceeds the variable range while the determining unit does not determine that any one the preliminary corrections corresponding to all of the changed values within the changeable range is proper, the one of the changed values of the correcting variable corresponding to the highest estimated value in all of the estimated values.

13. An apparatus according to claim 10, further comprising a binarizing unit configured to binarize the image data based on the picked-up image to determine whether the binarized image data is accurately decodable based on a decoding quality level, and wherein the establishing unit is configured to start to establish the preliminary correcting region on part of the image data when the binarizing unit determines that the binarized image data is not accurately decodable based on the decoding quality level.

14. An apparatus having a photodetector with a plurality of pixels arranged in at least one dimension and designed to optically pick up an image of an information code by the pixels of the photodetector, the apparatus comprising:
an establishing unit configured to establish a preliminary correcting region on part of image data based on the picked-up image;
a preliminary correcting unit configured to:
provide a correcting variable that represents a shift amount of the image data; and
preliminarily correct the part of the image data within the preliminary correcting region based on a value of the correcting variable;

a determining unit configured to determine whether the preliminary correction of the preliminary correcting unit is proper based on the corrected result; and a correcting unit configured to, when the determining unit determines that the preliminary correction of the preliminary correcting unit is proper, correct the image data based on the value of the correcting variable, wherein a changeable range of the value of the correcting variable is previously determined, further comprising:

an excess determining unit configured to determine whether a currently changed value of the correcting variable exceeds the variable range; and a notice sending unit configured to, when the excess determining unit determines that the currently changed value of the correcting variable exceeds the variable range while the determining unit does not determine that any one the preliminary corrections corresponding to all of the changed values within the changeable range is proper, send a notice representing that all of the changed values of the correcting variable within the changeable range are not proper.

15. An apparatus according to claim 14, further comprising a binarizing unit configured to binarize the image data based on the picked-up image to determine whether the binarized image data is accurately decodable based on a decoding quality level, and wherein the establishing unit is configured to start to establish the preliminary correcting region on part of the image data when the binarizing unit determines that the binarized image data is not accurately decodable based on the decoding quality level.

16. A program product having a computer program and a computer readable storage media bearing the computer program, the computer program being designed to optically pick up an image of an information code by pixels of a photodetector, the computer program comprising:

first means for instructing the computer to establish a preliminary correcting region on part of image data based on the picked up image;

second means for instructing the computer to provide a correcting variable that represents a shift amount of the image data;

third means for instructing the computer to preliminarily correct the part of the image data within the preliminary correcting region based on a value of the correcting variable;

fourth means for instructing the computer to determine whether the preliminary correction of the preliminary correcting unit is proper based on the corrected result; and fifth means for, when the fourth means determines that the preliminary correction of the preliminary correcting unit is proper, instructing the computer to correct the image data based on the value of the correcting variable, wherein the image data is composed of gray levels of the pixels of the photodetector, the value of the correcting variable represents a number n of pixels corresponding to the shift amount of the image data, and the third means is configured to instruct the computer to preliminarily correct the gray level of each pixel of the photodetector within the preliminary correcting region based on the value of the correcting variable.

17. A program product having a computer program and a computer readable storage media bearing the computer program, the computer program being designed to optically pick up an image of an information code by pixels of a photodetector, the computer program comprising:

first means for instructing the computer to establish a preliminary correcting region on part of image data based on the picked up image;

second means for instructing the computer to provide a correcting variable that represents a shift amount of the image data;

third means for instructing the computer to preliminarily correct the part of the image data within the preliminary correcting region based on a value of the correcting variable;

fourth means for instructing the computer to determine whether the preliminary correction of the preliminary correcting unit is proper based on the corrected result; and fifth means for, when the fourth means determines that the preliminary correction of the preliminary correcting unit is proper, instructing the computer to correct the image data based on the value of the correcting variable, wherein the preliminary correcting region is established on the part of the image data so as to correspond to a center portion of a field of view of the photodetector, the pixels of the photodetector are arranged in a matrix, the preliminary correcting region is composed of a vertical pixel line parallel to a vertical scan line of the photodetector and a horizontal pixel line parallel to a horizontal scan line thereof, and each of the vertical pixel line and the horizontal pixel line comprises dozens of pixels.

18. A program product having a computer program and a computer readable storage media bearing the computer program, the computer program being designed to optically pick up an image of an information code by pixels of a photodetector, the computer program comprising:

first means for instructing the computer to establish a preliminary correcting region on part of image data based on the picked up image;

second means for instructing the computer to provide a correcting variable that represents a shift amount of the image data;

third means for instructing the computer to preliminarily correct the part of the image data within the preliminary correcting region based on a value of the correcting variable;

fourth means for instructing the computer to determine whether the preliminary correction of the preliminary correcting unit is proper based on the corrected result; and fifth means for, when the fourth means determines that the preliminary correction of the preliminary correcting unit is proper, instructing the computer to correct the image data based on the value of the correcting variable, wherein the third means is configured to instruct the computer to:

preliminarily correct the part of the image data within the preliminary correcting region based on the value of the correcting variable and;

when it is determined that the preliminary correction corresponding to the value of the correcting variable is not proper based on the corrected result, repeatedly change the value of the correcting variable to preliminarily correct the part of the image data within the preliminary correcting region based on every changed value of the correcting variable until it is determined that the preliminary correction corresponding to any one of the changed values of the correcting variable is proper, and wherein the fourth means is configured to instruct the computer to:

calculate a ratio of pixels each having one of a maximum gray level and a minimum gray level to total pixels in the preliminary correcting region every changed value of the correcting variable as an estimated value; and store each of the estimated values and each of the changed values of the correcting variable in a memory to be associated with each other.

19. A program product having a computer program and a computer readable strage media bearing the computer program, the computer program being designed to optically pick up an image of an information code by pixels of a photodetector, the computer program comprising:

first means for instructing the computer to establish a preliminary correcting region on part of image data based on the picked up image;

second means for instructing the computer to provide a correcting variable that represents a shift amount of the image data;

third means for instructing the computer to preliminarily correct the part of the image data within the preliminary correcting region based on a value of the correcting variable;

fourth means for instructing the computer to determine whether the preliminary correction of the preliminary correcting unit is proper based on the corrected result; and fifth means for, when the fourth means determines that the preliminary correction of the preliminary correcting unit is proper, instructing the computer to correct the image data based on the value of the correcting variable, wherein a changeable range of the value of the correcting variable is previously determined, further comprising:

sixth means for instructing the computer to determine whether a currently changed value of the correcting variable exceeds the variable range; and seventh means for instructing the computer to, when it is determined that the currently changed value of the correcting variable exceeds the variable range while it is not determined that any one the preliminary corrections corresponding to all of the changed values within the changeable range is proper, send a notice representing that all of the changed values of the correcting variable within the changeable range are not proper.

20. A method of optically picking up an image of an information code by pixels of a photodetector with a plurality of pixels arranged in at least one dimension, the method comprising:

establishing a preliminary correcting region on part of image data based on the picked-up image;

providing a correcting variable that represents a shift amount of the image data;

preliminarily correcting the part of the image data within the preliminary correcting region based on a value of the correcting variable;

determining whether the preliminary correction of the preliminary correcting unit is proper based on the corrected result; and when the determination determines that the preliminary correction of the preliminary correcting unit is proper, correcting the image data based on the value of the correcting variable, wherein the image data is composed of gray levels of the pixels of the photodetector, the value of the correcting variable represents a number n of pixels corresponding to the shift amount of the image data, and the preliminary correcting step is configured to preliminarily correct the gray level of each pixel of the photodetector within the preliminary correcting region based on the value of the correcting variable.

21. A method of optically picking up an image of an information code by pixels of a photodetector with a plurality of pixels arranged in at least one dimension, the method comprising:

establishing a preliminary correcting region on part of image data based on the picked-up image;

providing a correcting variable that represents a shift amount of the image data;

preliminarily correcting the part of the image data within the preliminary correcting region based on a value of the correcting variable;

determining whether the preliminary correction of the preliminary correcting unit is proper based on the corrected result; and when the determination determines that the preliminary correction of the preliminary correcting unit is proper, correcting the image data based on the value of the correcting variable, wherein the preliminary correcting region is established on the part of the image data so as to correspond to a center portion of a field of view of the photodetector, the pixels of the photodetector are arranged in a matrix, the preliminary correcting region is composed of a vertical pixel line parallel to a vertical scan line of the photodetector and a horizontal pixel line parallel to a horizontal scan line thereof, and each of the vertical pixel line and the horizontal pixel line comprises dozens of pixels.

22. A method of optically picking up an image of an information code by pixels of a photodetector with a plurality of pixels arranged in at least one dimension, the method comprising:

establishing a preliminary correcting region on part of image data based on the picked-up image;

providing a correcting variable that represents a shift amount of the image data;

preliminarily correcting the part of the image data within the preliminary correcting region based on a value of the correcting variable;

determining whether the preliminary correction of the preliminary correcting unit is proper based on the corrected result; and when the determination determines that the preliminary correction of the preliminary correcting unit is proper, correcting the image data based on the value of the correcting variable, wherein the preliminary correcting step includes:

preliminarily correcting the part of the image data within the preliminary correcting region based on the value of the correcting variable and;

when the determining step determines the preliminary correction corresponding to the value of the correcting variable is not proper based on the corrected result, repeatedly changing the value of the correcting variable to preliminarily correct the part of the image data within the preliminary correcting region based on every changed value of the correcting variable until the determining step determines that the preliminary correction corresponding to any one of the changed values of the correcting variable is proper, and wherein the determining step includes:

calculating a ratio of pixels each having one of a maximum gray level and a minimum gray level to total pixels in the preliminary correcting region every changed value of the correcting variable as an estimated value; and storing each of the estimated values and each of the changed values of the correcting variable in a memory to be associated with each other.

23. A method of optically picking up an image of an information code by pixels of a photodetector with a plurality of pixels arranged in at least one dimension, the method comprising:

establishing a preliminary correcting region on part of image data based on the picked-up image;

providing a correcting variable that represents a shift amount of the image data;

preliminarily correcting the part of the image data within the preliminary correcting region based on a value of the correcting variable;

determining whether the preliminary correction of the preliminary correcting unit is proper based on the corrected result; and when the determination determines that the preliminary correction of the preliminary correcting unit is proper, correcting the image data based on the value of the correcting variable, wherein a changeable range of the value of the correcting variable is previously determined, further comprising:

determining whether a currently changed value of the correcting variable exceeds the variable range; and when it is determined that the currently changed value of the correcting variable exceeds. the variable range while it is not determined that that any one the preliminary corrections corresponding to all of the changed values within the changeable range is proper, sending a notice representing that all of the changed values of the correcting variable within the changeable range are not proper.

* * * * *